United States Patent [19]

Stieglitz

[11] Patent Number: 4,590,468
[45] Date of Patent: May 20, 1986

[54] TOKEN ACCESS CONTROLLER PROTOCOL AND ARCHITECTURE

[75] Inventor: Mark Stieglitz, Irvine, Calif.

[73] Assignee: Western Digital Corporation, Irvine, Calif.

[21] Appl. No.: 474,135

[22] Filed: Mar. 10, 1983

[51] Int. Cl.⁴ .................... H04Q 9/00; G06F 13/00; G06F 15/16
[52] U.S. Cl. .................... 340/825.5; 370/94; 340/825.52; 364/200
[58] Field of Search .................... 340/825.5, 825.52; 455/607; 370/85, 90, 94, 96; 364/200, 900

[56] References Cited

U.S. PATENT DOCUMENTS

Re. 31,852  3/1985  Soderblom .................... 370/90
4,441,162   4/1984  Lillie .................... 370/85
4,494,185   1/1985  Gunderson et al. .................... 455/607

OTHER PUBLICATIONS

*Electronics*, Jan. 27, 1982, "Local Networks Will Multiply Opportunities in the 1980s", et al., pp. 89–99.
"Local Network Access Tradeoffs" by Mark Stieglitz, Oct., 1981, from Computer Design.
"Token Access Controller Minimizes Network Complexity", Mar., 1982, from Mini-Micro Systems.

*Primary Examiner*—Donald J. Yusko
*Attorney, Agent, or Firm*—Spensley Horn Jubas & Lubitz

[57] ABSTRACT

Disclosed is a token access protocol for a local area network and the architecture for a token access controller to implement this protocol. The protocol provides for network initialization, recovery and addition of nodes to the network. The host of each node has a minimal involvement with maintaining the network and the protocol does not require the host processor to format frames for transmission. Data reception or transmission is facilitated through the use of a Direct Memory Access (DMA) so the host processor is freed to perform other tasks while data is being transmitted or received.

24 Claims, 27 Drawing Figures

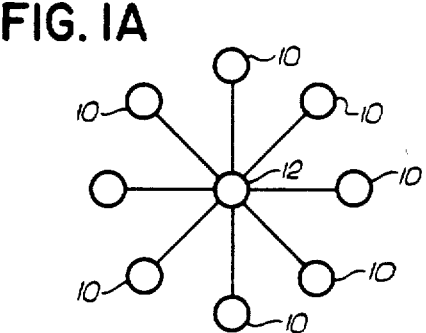
FIG. 1A
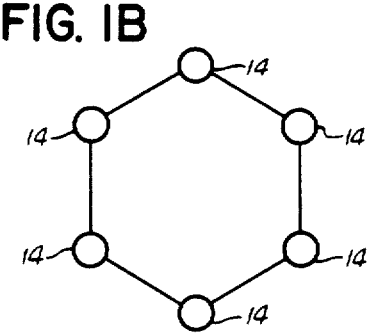
FIG. 1B
FIG. 1C
FIG. 2A
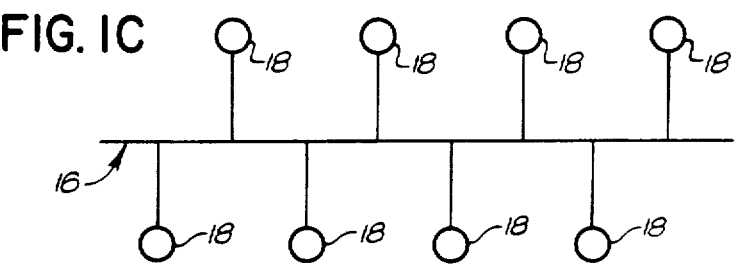
FIG. 2B
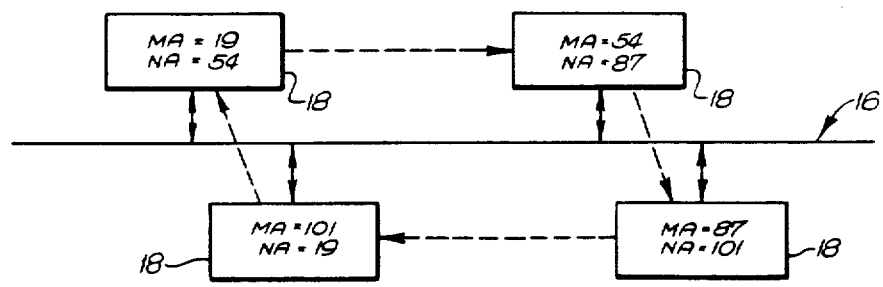
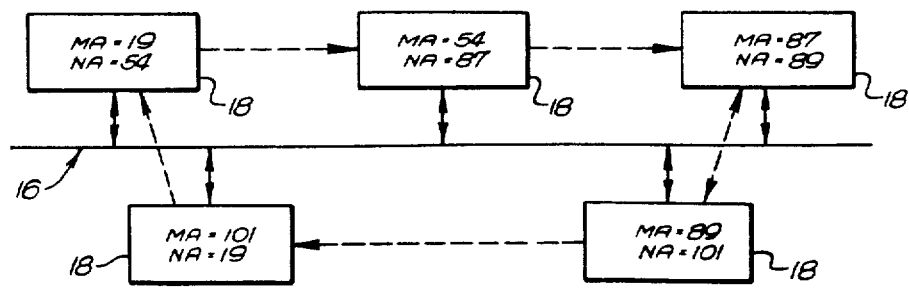

TRANSMIT BUFFER CHAIN

RECEIVE BUFFER CHAIN

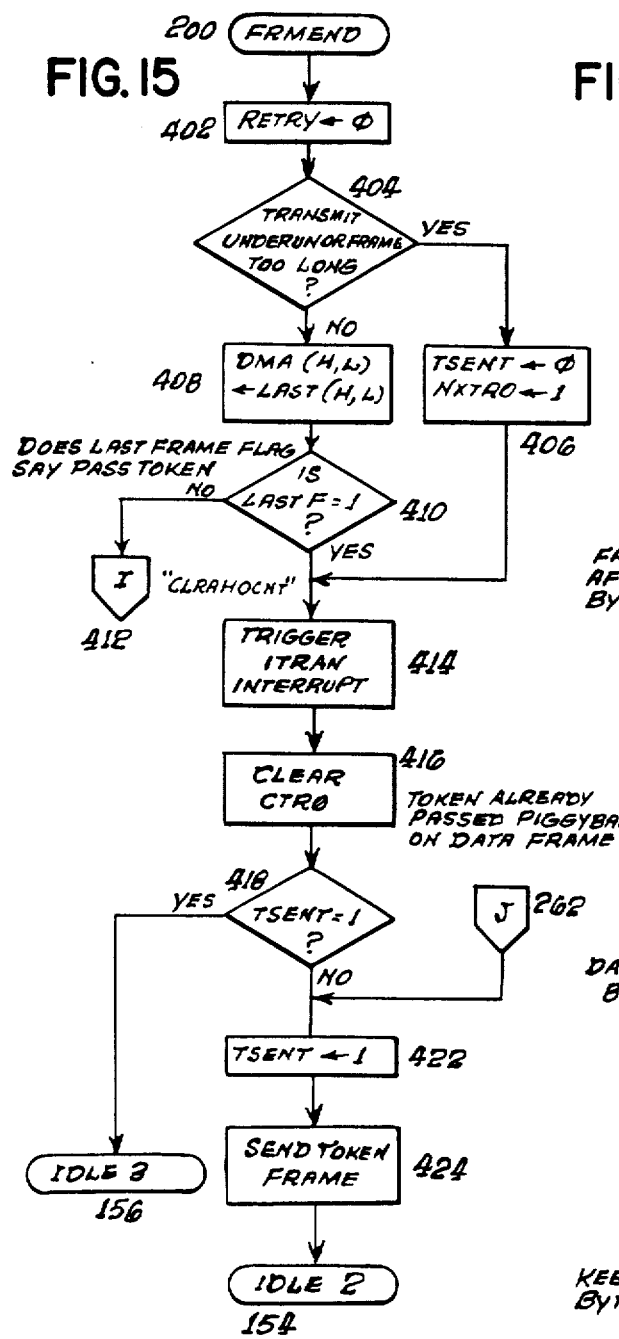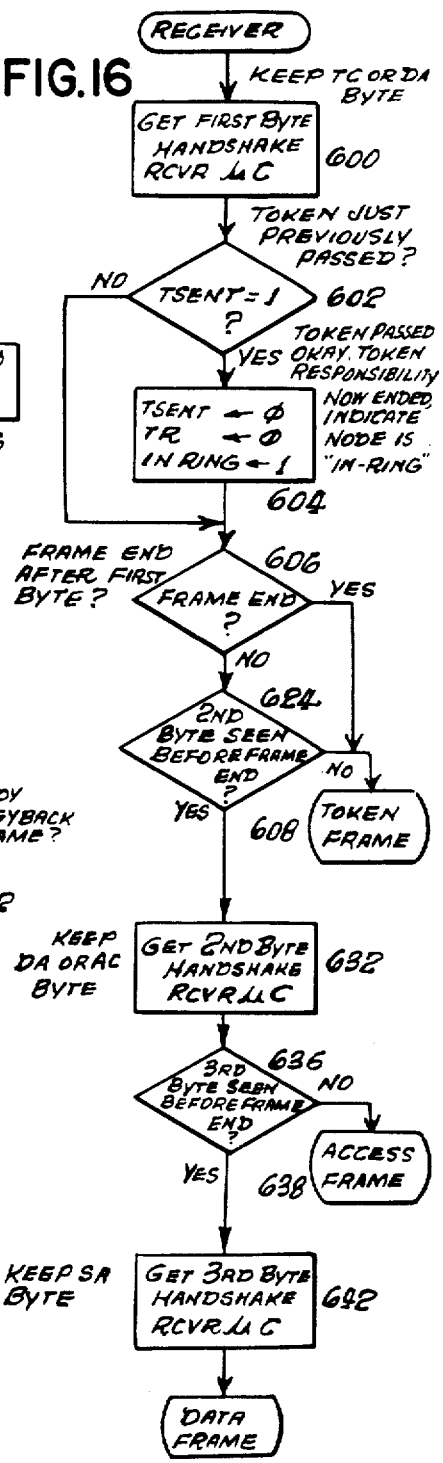

TOKEN ACCESS CONTROLLER PROTOCOL AND ARCHITECTURE

BACKGROUND OF THE INVENTION

1. Field of the Invention

The present invention relates to protocols for access to local area networks (LAN) and more particularly to protocols for token access controllers for local access networks.

2. Description of the Prior Art

Local Area Networks, which are usually privately owned communication systems with data rates in excess of one hundred thousand bits per second, can have a number of different topologies. A LAN has a number of nodes; each node is some type of device such as a mainframe computer, a printer, a micro-computer or a terminal. A LAN permits nodes to communicate with each other on the network. A node usually has a host processor, some memory and it can have other components such as a printer or a disc drive.

Among the more common topologies used for LANs are the star topology, the ring topology, and bus topology (FIG. 1). When a star topology is used (FIG. 1A), all nodes 10 in the network communicate with each other only with the explicit permission of a central node 12. In a ring topology, (FIG. 1B) each node 14 can only communicate directly with one of the two adjacent nodes of the ring. And information that is to be communicate to a non-adjacent node must be transmitted through those nodes between the source of the message and its destination. In a bus topology, (FIG. 1C) each node 16 can communicate directly with any other node through the bus 18. Each topology has its advantages and drawbacks.

An advantage of both the star topology and the ring topology is that the protocol for allowing access by a node to the network is relatively simple. The drawbacks of a star topology are a high initial cost, reliability problems, and the difficulty of reconfiguring the network to accept new nodes. The drawbacks with ring topologies are that a ring requires active taps and reliability is not good because if one node of the ring fails, the entire ring ceases to function.

On the other hand, a bus topology can be easily reconfigured to accept new nodes, it can be media independent, and the distributed control to the various nodes of the network improves the reliability of the network.

A major disadvantage of using a bus is that a complex protocol is required to prevent two nodes from transmitting simultaneously. A number of protocols have been developed to arbitrate access to the bus. Among the more sophisticated of these protocols are token protocols.

Token protocols establish a logical loop for the members of the computer network. The four-node bus network shown in FIG. 2A has a token, which is the right to transmit information on the network bus. The token is passed from node to node via a predetermined field. Only the node that currently has the token has access to transmit on the bus except that a node that just received a transmission may transmit a confirmation message called an acknowledgement. Each node has its own unique identity address (MA) and the address of the device it will send the token to after finishing its transmission. For example, if a node having an address set to 19 (MA=19) has the token, all the other devices on the network cannot have access to the bus 16. While node MA=19 (node 19) has the token, it can send a message to any other node in the local network. When node 19 has finished sending its messages, node 19 will then pass the token to the member of the network whose address is loaded in node 19's next or successor address (NA) register. In this example, node 19's next address is node 54. When node 54 is finished sending its messages, it will send the token to the device whose address is in device 54's next address register. In this case, that node is node 87. When node 87 has sent its messages, it will in turn send the token to node 101. Node 101 will return the token to node 19 in this example. Dotted lines 22 show how the token is passed from node to node in a logical loop. This process will repeat itself until the token is lost (e.g., noise on the bus), one of the nodes of this LAN is taken off the network (e.g., its power is turned off), a duplicate token is erroneously created causing two nodes to transmit simultaneously, or a new node is to be added to the network.

In the latter case, the addition of a node to the loop requires that the next address (NA) of one of the current nodes must be changed to the address of the device requesting entry into the loop. In turn, this new entrant must have as its next address its predecessor's former next address. Thus, in FIG. 2B with node 89 entering the logical ring, node 89 will now have as its next address NA=101 and node 87 will have as its next address NA=89. The identity and next address of each node do not have to be in numerical order as as the assignment of next addresses forms the logical loop.

A number of implementations of token protocols for bus topologies are available. Generally, the token protocols are implemented by those access controllers. Each node has a token access controller that connects that node to the bus.

Most of the bus topology systems that use a token method for allocating access to the bus are machine specific. In other words, these machines are designed to work with each other and with no other machines. One example is the token access controller for the Datapoint Corporation's computer system. Datapoint has developed a system called ARCNET, which is a LAN using token access controllers for bus arbitration. Furthermore, the current implementation of Datapoint design also requires special additional hardware including an external RAM buffer. ARCNET also requires a special format for its information transmission so only those devices that can use the ARCNET format can be included in nodes on the network. The number of frames that can be put onto the queue for transmission by a node is limited due to the size of the RAM buffer.

Accordingly, it is an object of the present invention to provide a token access controller and a token access protocol which interfaces between a host system and any common transmission medium. It is another object of this invention to provide a protocol that easily allows additional nodes to be coupled to the token ring. It is a further object of this invention that the transfer of data to or from the network is accomplished with a minimal amount of involvement with the host system. Furthermore, it is an additional object of this invention to provide a controller that allows recovery of the system in case there are two token on the system or a tokens is lost.

SUMMARY OF THE INVENTION

These and other objects of the invention are provided by the token access controller (TAC) and protocol disclosed below. The TAC allows nodes to communicate with each other by transmitting frames over the network bus. Frames are packages of information that include certain sequences for indicating the beginning and the end of the frame and for detecting errors in the transmission of the frame.

The preferred embodiment of the TAC is implemented on an LSI integrated circuit. The process of the protocol is controlled in the TAC by a microcontroller and a ROM. Certain registers in the TAC are accessible by the host system, and the TAC contains control circuitry and a direct memory access (DMA) circuit. In addition, there is a transmitter microcontroller (UT) and a receiver microcontroller (UR) controlling a transmitter and receiver respectively. The transmitter microcontroller regulates all transmissions of data to the network bus and certain encryption sequences while the receiver microcontroller directs certain decoding sequences of received data. Generally, the host system can operate independent of the token access controller.

The TAC is responsible for initializing the network, rebuilding the network after network failures, performing network diagnostic routines, transmitting data onto the network bus or receiving data from the network bus, sending data received acknowledgements, and passing the token that is used for control of the network. Thus, the host device is free to perform other tasks and only must occasionally interface with the TAC.

The TAC performs these functions by having stored within it its identity address (MA) and the address (NA) of the device that it will pass the token to next. During network initialization, each host system loads a unique value into its TAC's MA to represent its own address. At a certain time, subsequent to entering a network over which no communication is being done, the TAC will start sending inquiries to address MA+1 to see whether a TAC with that address is on the network. If such a node is not on the network, the original TAC will send inquiries to address MA+2, etc., until another node on the network responds. At that point, the TAC that responded has the token and the inquiring TAC will also store that TAC's address in its next address register. The TAC that has just received the token will repeat this process, until eventually one TAC passes the token back to the first node. At this point the logical loop has been established. Of course, while the network is being established, each host can perform some tasks while waiting for the network to be established.

Once the network has been established, then the node with the token will either start transmitting data, or, if it has no data to transmit, it will simply pass the token to the node whose address is in its NA register. If a transmitting node wishes to ensure that the data it has transmitted was correctly received, it will send a special token to the destination node. The destination node, upon receipt of the data, will send a special frame, called an access control frame, back to the transmitting node. While the transmitting TAC is waiting for the access control frame, its host computer can continue to perform other processes. When the TAC is done sending data, it will simply pass the token to the next node.

There are certain priority schemes included in this token passing system so that some nodes can send data more frequently than other nodes. This is again largely handled by the TAC and requires only minimal involvement of the host system.

The host system has little to do with the transmission or reception of data or formatting data to be transmitted onto the network. Newly received data or data that is about to be sent is stored in the host's memory in special buffers of a specific size which have been allocated by the host. A link field is created in each buffer so that the link of each buffer points directly to the address of the next buffer, forming a chain of buffers. There is one chain of buffers used for frames that are sent to this TAC and there is another chain of buffers for frames that are to be transmitted by this TAC. The host is responsible for setting up these links in the memory. This allows virtually unlimited amounts of memory to be available to the TAC for reception or transmission of data.

The TAC is responsible through its direct memory access (DMA) for writing received data into its host's memory or reading data to be transmitted from its host's memory. For transmitting data, the host loads data into the buffers and the next time the TAC receives the token, the TAC will start to use its DMA to read the data from the buffer and send it out onto the network bus. Similarly, if data is being sent to this TAC by another node, then the TAC will read the data from the network bus and directly enter it into the buffers in memory without requiring any assistance from the host (once the buffer linkage has been established).

If a node on the network fails, or if a node on the network is simply removed from the network (such as by turning power off), then the TAC that has the removed or failed node's address in its NA register will then be unable to pass the token to that node. The TAC will then automatically start incrementing its NA register until it can send the token to a node that is still on the network. Thus, the host system is not involved with this recovery process.

If the token is lost, no node will be able to send data on the bus. To reestablish the logical ring, each TAC has a TD timer, which monitors the bus for data transmission activity. If there is no activity on the bus after a certain period, this TD timer will time-out and the TAC will then simply arbitrarily assign itself the token. When a TAC's timer times out, that TAC will then send the token to the next node in its next address register (NA) and the network will be reestablished. Again, the host system has only minimal involvement. Usually, the TD timer of each TAC is set to time out at a different time than the TD timer of the other TAC's. If two TAC's TD timers time out simultaneously, they will detect that there are two tokens on the network and remedy the condition.

There are three ways to add nodes to a network. These are distributed polling, centralized polling, or central scanning. In distributed polling, each node of the network is responsible for polling a certain address range to determine if there are any new nodes desiring to enter the logical ring. If there are, that node resets its next address to the station that desires to gain entry to the ring and then can either continue to send data or send a token to that station. In centralized polling, one node is charged with the polling task and polls the entire address range. In centralized scanning, each TAC is required to reset its next address register to the address of the next address that a node could possibly have. Each TAC will then poll above its address until it receives a response from another node. Each TAC will then set its NA register to that node's address.

Although the preferred embodiment envisions the use of a custom LSI integrated circuit, this invention could be implemented with a microprocessor and associated hardware and software, or entirely in software.

BRIEF DESCRIPTION OF THE DRAWINGS

FIGS. 1A-C are a drawing of three different Local Access Network (LAN) configurations.

FIG. 2A is a drawing of a 4-anode LAN using a token protocol.

FIG. 2B is a drawing of the LAN of FIG. 2A after a fifth node has been added.

FIGS. 8 through 24 are flow charts of the protocol for this invention.

DETAILED DESCRIPTION OF THE PREFERRED EMBODIMENT

The novel features of this invention, both as to its architecture and its protocol, together with further objectives and advantages thereof, will be better understood from the following description, considered in connection with the accompanying drawings, in which a presently preferred embodiment of the invention is described by way of example. It is expressly understood, however, that the drawings and description of the preferred embodiment are not intended as a definition of the limits of the invention.

The description of this invention is divided into three parts. The first section is the architecture of an integrated circuit embodying the invention. The second section explains the types of frames that may be transmitted on the network and explains the memory buffer structure. The third section explains the token access control protocol for the invention.

A. The Architecture

Figure 3:
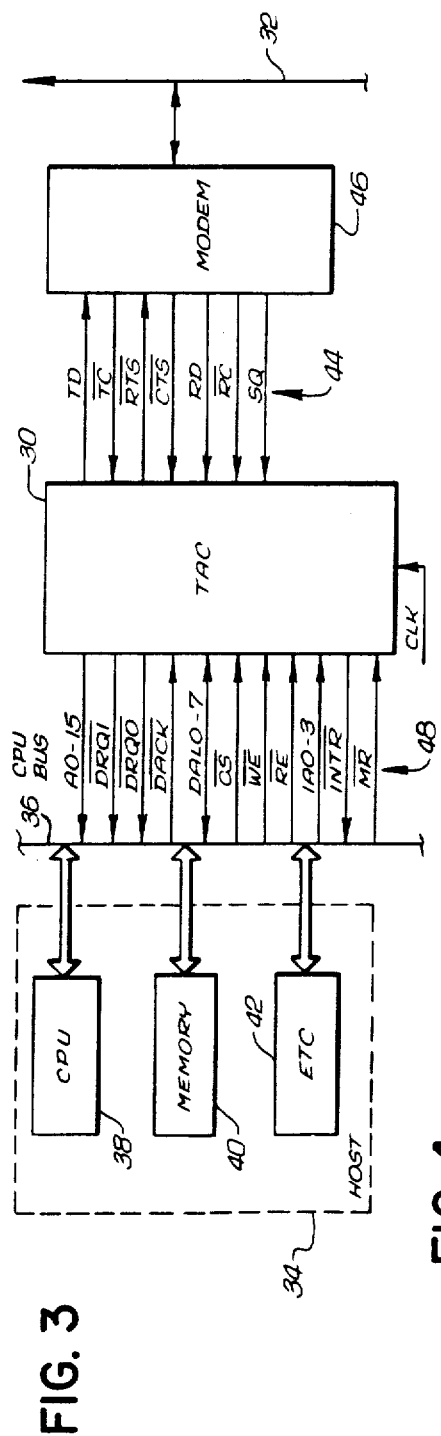
FIG. 3 is a block diagram showing how an integrated circuit embodying this invention is connected to a network.

FIG. 3 is a block diagram of how a token access controller is typically used to connect a host system to a network. The TAC 30 serves as an interface between the network bus 32 and the host's 34 internal bus 36. The host must have a processor 38 and memory 40 coupled through the host's internal bus 36. One or more other devices 42 (such as printers, terminals or disk controllers) may also be connected to the internal bus 36. Generally, a modem 46 or some other interface device is used to connect the TAC to the network bus 32. The network bus can be anyone of several transmission mediums. The TAC/NETWORK control lines 44 and the TAC/HOST control lines 48 connect the TAC to the modem 46 and the host bus 36, respectively.

The functions of the control lines (44 and 48) are given in Table 1. These control lines are deliberately chosen because they can directly interface with many different devices in the market. In some applications a simple interface circuit may be needed for the TAC to connect to the host's bus or the network bus.

Figure 4:
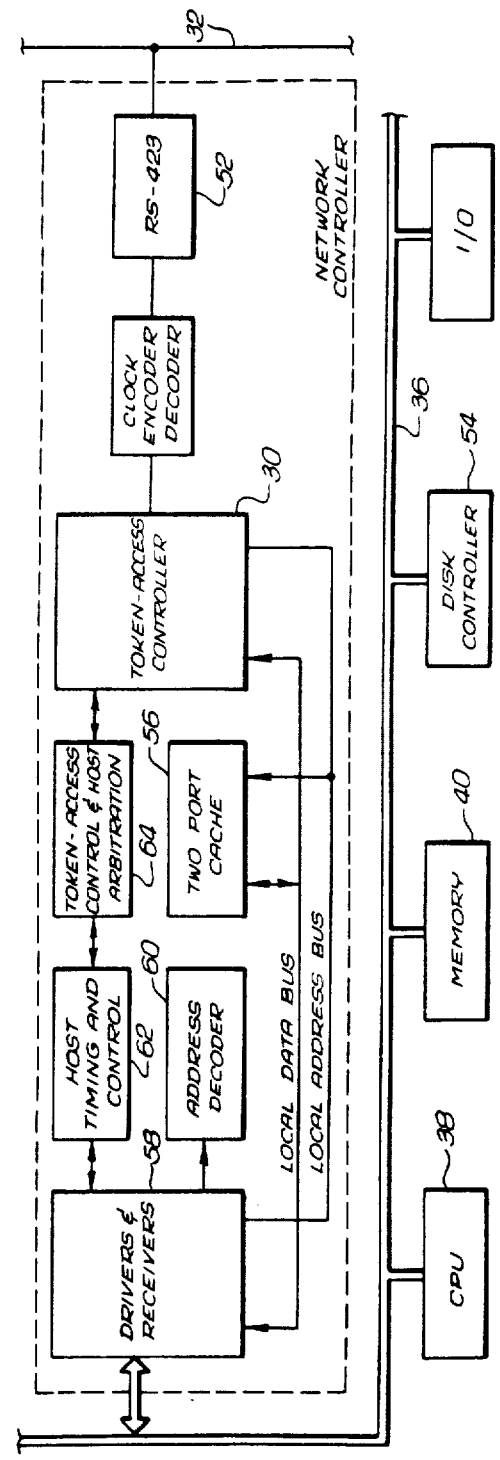
FIG. 4 is a block diagram showing how an integrated circuit embodying this invention can be connected to a network and have a cache memory.

If the TAC will be used in an application where memory access latency is a drawback, then a two-port cache memory can be used to interface the TAC to the host, as shown in FIG. 4. In FIG. 4, the TAC 30 connects via an interface device 52 to the network bus 32. Because the host memory 40 will often be "dominated" by the disk controller 54, the TAC 30 is provided with a two-port cache memory 56 so adequate memory is available to the TAC for transmitting or receiving data on a timely basis. When the host memory 40 is freed by the disk Controller 54, the host 34 can start writing from the cache 56 into the host memory 40, or vice-versa. Drivers and receivers 58, address decoders 60, host timing 62 and TAC/HOST arbitration 64 circuits are used to interface the TAC and the host's central processing unit (CPU). These components (58-64) are typical of two-port memories.

Figure 5:
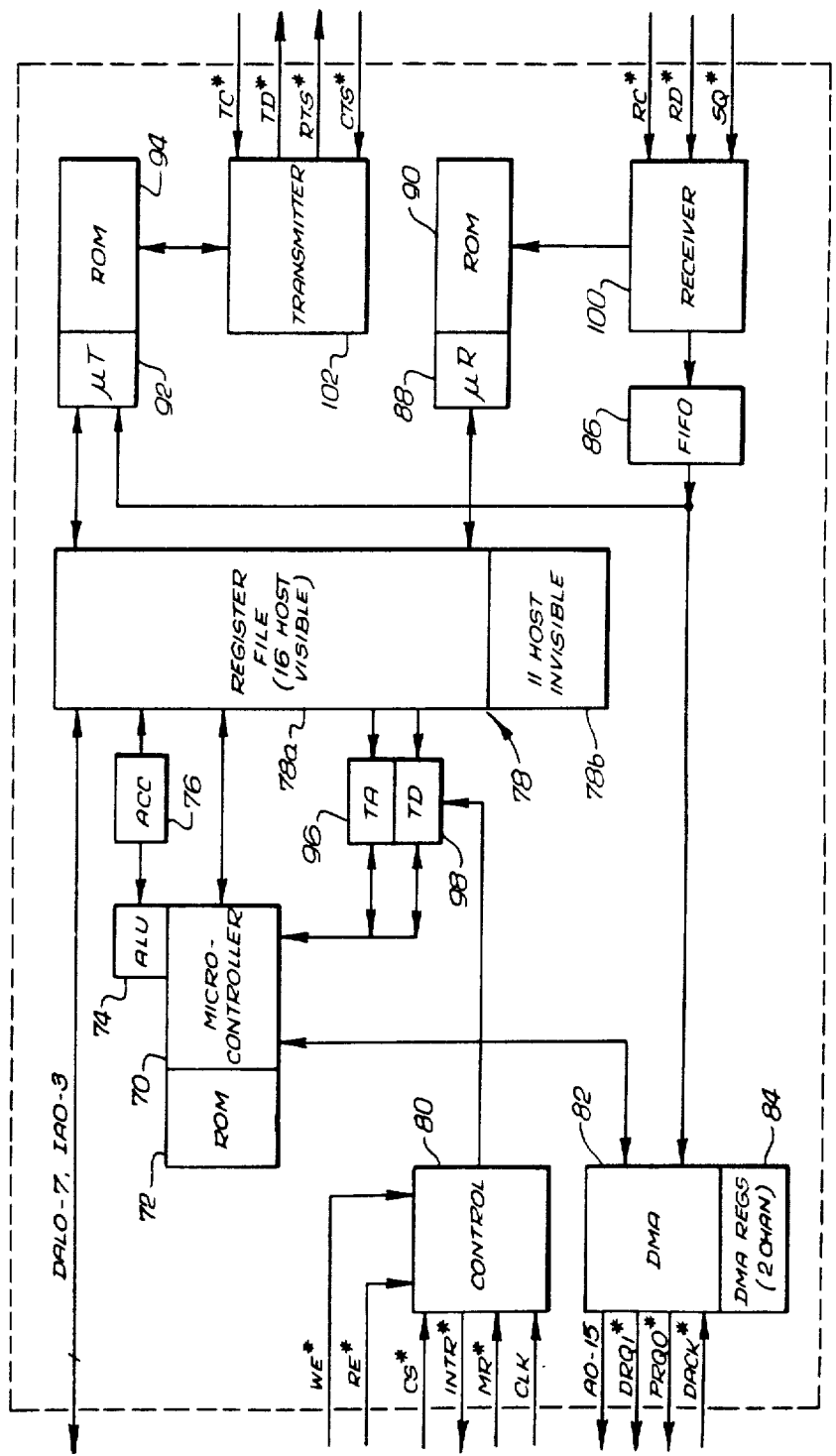
FIG. 5 is a block diagram of the logical architecture of a large scale integrated circuit embodying this invention.

FIG. 5 is a block diagram of the architecture of the TAC 30. The TAC is controlled by a general purpose microcontroller 70. This microcontroller 70 has a ROM 72 containing the firmware for the TAC, an Arithmetic Logic Unit (ALU) 74, and an accumulator register (ACC) 76. There is a register file 78 with 27 registers. Sixteen of these registers are host visible and eleven registers are invisible to the host. A register is visible if the host can read data directly from the register and/or write data directly into the register. There is also a control logic 80, a direct memory access (DMA) circuit 82 with DMA registers, a First In First Out buffer 86 for received data, a receiver microcontroller (UR) 88 and its associated ROM 90, a transmitter microcontroller (UT) 92 and its associated ROM 94, an acknowledge timer (TA) 96, and a network dead timer (TD) 98. There is also a transmitter 102 and a receiver 100. Internal signal lines coupling these component circuits are shown, with the arrows indicating the direction of information flow. Thus the line from the general microcontroller 70 to the register file 78 is bi-directional. The external signal lines are identified in Table 1. (Symbols marked with an asterisk denote negative logic functions).

TABLE 1

| | EXTERNAL SIGNAL LINES | |
|---|---|---|
| SYMBOL | NAME | FUNCTION |
| SQ* | SIGNAL QUALITY | An active low input which signals the TAC that a frame may be received. The modem or similar device may clear this signal if the modem receives a signal of a quality below a reliability threshold, ensuring that the TAC will not accept the frame. |
| CS* | CHIP SELECT | Active low chip select for CPU control of I/O registers. |
| RE* | READ ENABLE | The content of the selected register is placed on the Data Access Lines (DAL) when CS* and RE* are low. |
| WE* | WRITE ENABLE | The data on the Data Access Lines (DAL) are written into the selected register when CS* and WE* are low. (RE* and WE* must not be low |

TABLE 1-continued
EXTERNAL SIGNAL LINES

| SYMBOL | NAME | FUNCTION |
|---|---|---|
| | | at the same time.) |
| CLK | CLOCK | Clock input used for internal timing. |
| MR* | MASTER RESET | Initialize on active low. All registers reset to zero, except control bit ISOL (CR00) is set to one. |
| DAL0-7-DAL7 | DATA ACCESS LINES | An 8-bit bi-directional three-state bus for CPU and DMA controlled data transfers. |
| RD | RECEIVE DATA | Receive serial data input. |
| RC* | RECEIVE CLOCK | This is an external clock input. RD is sampled on the rising edge of RC*. |
| TC* | TRANSMIT CLOCK | An external clock input. TD changes on the falling edge of TC*. |
| TD | TRANSMIT DATA | Transmitted serial data output. |
| RTS* | REQUEST-TO-SEND | An open collector output which goes low when the TAC is ready to transmit either data or flags. |
| CTS* | CLEAR-TO-SEND | An active low input which signals the TAC that transmission may begin. |
| DRQO* | DMA REQUEST OUT | An active low output signal to initiate CPU bus requests so that the TAC can output data onto the host's bus. |
| DRQI* | DMA REQUEST IN | An active low output signal to initiate CPU bus requests so that data may be input to the TAC from the host's bus. |
| DACK* | DMA ACKNOWLEDGE | An active low input from the host CPU done in response to DRQO* or DRQI*. DACK* must not be low if CS* and RE* are low or if CS* and WE* are low. DACK* must be set before MR* is set. |
| A0-A15 | ADDRESS LINES | Sixteen address outputs from the TAC to the host's bus for DMA operation. |
| INTR* | INTERRUPT REQUEST | An active low interrupt service request output. Returns high when the Interrupt Register (IR0) has been read by the host. |
| IA0-IA3 | ADDRESS LINE IN | Four address inputs to the TAC for host controlled read/write operations with registers in the TAC. |

A detailed description of the register file is given in Tables 2-14. Table 2 lists the visible registers while Table 3 lists the invisible registers.

TABLE 2
VISIBLE REGISTERS

| Register Address (Hexidecimal) | Name | Symbol |
|---|---|---|
| 0 | Control Register 0 | CR0 |
| 1 | Control Register 1 | CR1 |
| 2 | Status Register 0 | SR0 |
| 3 | Interrupt Register 0 | IR0 |
| 4 | Status Register 1 | SR1 |
| 5 | Status Register | SR2 |
| 6 | Counter Register 0 | CTR0 |
| 7 | Next Address | NA |
| 8 | Acknowledge Timer Limit | TAL |
| 9 | Network Dead Timer Limit | TDL |
| A | Control Block Pointer (MSB) | CBPH |
| B | Control Block Pointer (LSB) | CBPL |
| C | Next Address Request | NAR |
| D | Access Hold Off Limit | AHOLT |
| E | Transmit Limit | TXLT |
| F | My Address | MA |

TABLE 3
INVISIBLE REGISTERS

| Register Name | Symbol |
|---|---|
| Status Register 3 | SR3 |
| Enable Transmitter Receiver | ENTRR |
| Transmitter Control Register | TCR |
| Receiver Control Register | RCR |
| Scratch Pad 1 | AX1 |
| Scratch Pad 2 | AX2 |
| Scratch Pad 3 | AX3 |
| Direct Memory Access (LSB) | DMAL |
| Direct Memory Access (MSB) | DMAH |
| Last Buffer Address (LSB) | LASTL |
| Last Buffer Address (MSB) | LASTH |
| Next Transmit Register (LSB) | nxttl |
| Next Transmit Register (MSB) | nxtth |
| Next Receive Register (LSB) | nxtrl |
| Next Receive Register (MSB) | nxtrh |

For the purpose of clarity, several of the invisible registers have two different names even though they are the same register. For example, AX2 and DMAL are the same register.

Tables 4-10 define the functions of the registers listed in Table 2. Tables 4-9 are for individual registers; the bit number is given in the left hand column, with the least significant bit denoted as "0" and the most significant bit denoted as "7". Each bit's symbol is provided in the second column and the description of each bit's function is in the third column. There are two tables for Control Register 1 (CR1). Table 5 defines CR1 when the DIAGC bit (CR17) is clear. The other table, which defines the diagnostic tests for the TAC, has been omitted. Table 10 defines the functions of CTR0, NA, TAL, TDL, CBPH, CBPL, NAR, AHOLT, TXLT and MA.

TABLE 4

| CR0 - CONTROL REGISTER 0 DEFINITIONS | | |
|---|---|---|
| BIT | SYMBOL | DESCRIPTION |
| CR00 | ISOL | Isolate. Set true on power up or master reset. Host clears this bit after the host memory-based TAC control block and other TAC registers have been set up. CR00 may be set by the host at any time (will be ignored if TAC is in diagnostic state). There is some delay for the TAC to respond to any change of state request. A change of state to the network mode is acknowledged by clearing the state confirmation status bit (SR21 STATE). Setting ISOL while the TAC is in the network state will cause a change of state to the isolate state. The change of state is confirmed by an |

TABLE 4-continued

CR0 - CONTROL REGISTER 0 DEFINITIONS

| BIT | SYMBOL | DESCRIPTION |
|---|---|---|
| | | interrupt event bit (IR00-ITM) and the STATE status bit (SR21) being set. If the TAC has the token when ISOL is set, this transaction will be delayed until the node does not possess the token. Any in-progress frame transmission will be completed normally followed by a normal token pass sequence. |
| CR01 | NOINT | Master Interrupt Suppress. When this bit is clear, the TAC will generate host interrupt requests (INTR* low) if any bit in the TAC interrupt request register (IR0) is set. When NOINT is set, the interrupt requests are suppressed, but the TAC will still set the bits in IR0. Any interrupt request that has been set will be cleared by the TAC when IR0 is read. |
| CR02 | COPY | Enable COPY mode. When this bit is set it causes all received data frames to be accepted and DMA'ed into memory regardless of destination address. |
| CR03 | ILOOP | This bit instructs the TAC to loop data internally from transmitter to receiver during the LOOP diagnostic test. ILOOP must not be set while the TAC is in the network mode (CR00-ISOL clear). |
| CR04 | ITOKON | When this bit is cleared, the ITOK interrupt (IR02) is suppressed. |
| CR05 | RXEN | Receive Data Enable. When clear, the TAC still makes normal responses to supervisory frames (scan, token and access frames), but the TAC will not DMA any data frame into memory and ignores the receiver buffer chain. If any data frame that has an acknowledgement request (TC=255) is addressed to this node the TAC will respond with a "receiver not enabled" access frame. When RXEN is set, it allows the receive to DMA appropriate data frames into memory. RXEN may be arbitrarily set and reset while in the Network State but these changes will not take effect until the current frame being received by this TAC, if any, is completed. |
| CR06 | TXEN | Master Transmit Enable. When this bit is clear no transmissions will occur and the transmit buffer chain will be ignored. When this bit is set, transmission activity is further dependent upon TXDEN (CR07). |
| CR07 | TXDEN | Data Transmit Enable. Has no meaning unless TXEN is set. When TXDEN is set and in conjunction TXEN is set, normal TAC transmission of data and supervisory frames will occur. When TXDEN is cleared and TXEN is set, only data frame transmission will be suppressed. Token pass and access frames will still be transmitted when appropriate. |

TABLE 5

CR1 - CONTROL REGISTER 1 DEFINITIONS NETWORK STATE

| BIT | SYMBOL | DESCRIPTION |
|---|---|---|
| CR10 | NEWNA | When this bit is set the TAC copies the contents of register NAR into the register NA. The TAC clears this bit after the function is complete. This mechanism allows the host to change the TAC's successor in the logical ring. The node's next token pass will be to the new NA node. |
| CR11 | TOFF | When set causes TAC to ignore timers. This is not intended to be used in an operational network but is provided to support network diagnosis. When set this control bit disables all automatic network error recovery. |
| CR12 | — | (Not used, Reserved.) |
| CR13 | GIRING | This bit instructs the TAC to gain entry into the logical loop at the next opportunity (i.e. respond to a token pass). The INRING status bit (SR20) is used as confirmation; when INRING is set, it indicates that the TAC is participating in a logical loop of at least two nodes. If the host clears GIRING while INRING is set, the TAC will not accept the next token pass and it will then clear INRING to confirm the TAC is no longer in the logical loop. |
| CR14 | ADRV | When this bit is set, it enables the sixteen output address lines (A0–A15). If this bit is cleared the outputs are tri-state outputs and only function when DACK* goes low. If this bit is set, the outputs are always TTL levels. |
| CR15 | INIT | When this bit is clear, the TAC will not attempt to initialize or reinitialize the network if the network dead timer (TD) expires. When this bit is set, the TAC will enter Scan Mode when its TD timer expires. |
| CR16 | PIGT | If this bit is set, the TAC is instructed to piggyback the token on the last data frame transmitted. |
| CR17 | DIAGC | This bit causes the TAC to enter the diagnostic mode when ISOL is set. In the Network State this bit should be cleared. |

The definitions in this table apply when the TAC is in not in the diagnostic state (CR17=1). In the diagnostic state, the functions of most of the bits in the control register one are dedicated to specific diagnostic states.

TABLE 6

SR0 - STATUS REGISTER 0 DEFINITIONS

| BIT | SYMBOL | DESCRIPTION |
|---|---|---|
| SR00 SR01 SR02 SR03 | BSIZ | These four bits indicate to the TAC the size of all of the transmit and receiver buffers in the host's memory. Buffer sizes are in multiples of 64 bytes. If BSIZ=0, the buffers are 64 bytes long. If BSIZ=15, the buffers are 1024 bytes long. The value is obtained from the TAC control block contained in the host's memory. The control block is read when the TAC transitions from the Isolate State to Network State (see ISOL-CR00). |
| SR04 | — | Not used. |
| SR05 | L2 | An internal one-bit flag that is set during frame transmission if the length of the current frame is equal to eight For data frame transmission this means the frame has no data field; otherwise this flag is set if the frame is an access control frame. |
| SR06 | SENDACK | An internal flag set during data frame reception to indicate that the incoming frame should be acknowledged (by sending the appropriate access frame). This flag is cleared when the acknowledgement has been transmitted. |
| SR07 | LASTF | An internal flag set during data frame transmission to indicate that the current frame will be the last frame to be transmitted before the TAC passes the |

TABLE 6-continued

SR0 - STATUS REGISTER 0 DEFINITIONS

| BIT | SYMBOL | DESCRIPTION |
|---|---|---|
| | | token. Five situations can cause this to occur: (1) ISOL (CR00) is set, (2) TXDEN (CR07) is clear, (3) the current frame is flagged by the host as the last frame in the buffer's TFSB, (4) the current token frame count has reached the TXLT limit, or (5) the TAC detected a transmitter under-run error. Also if a piggy-back token is permitted (CR16 set) and no acknowledge is requested, the token will be piggybacked on the last data frame. |

TABLE 7

SR1 - STATUS REGISTER 1 DEFINITIONS

| BIT | SYMBOL | DESCRIPTION |
|---|---|---|
| SR10 | — | (Not used, reserved.) |
| . . | | |
| SR14 | | |
| SR15 | RECIDL | This bit indicates that the receiver is in the idle condition. The idle receiver condition occurs when the TAC has detected 15 continuous "ones." |
| SR16 | IRTS* | This indicates the transmitter is attempting to send a frame. |
| SR17 | TAOUT | The TAC's TA Timer has timed out if this bit has been set. |

TABLE 8

SR2 - STATUS REGISTER 2 DEFINITIONS

| BIT | SYMBOL | DESCRIPTION |
|---|---|---|
| SR20 | INRING | This bit is set to indicate the node had the token and successfully passed it at least once. This bit can be read to indicate the logical loop has at least two nodes. |
| SR21 | STATE | Depending on DIAGC (CR17), the TAC is either in Isolate or Diagnostic State. When ISOL (CR00) is set, if STATE is set, STATE confirms that the TAC is not in the Network State. When ISOL is clear, if STATE is clear that confirms the TAC is in the Network State. |
| SR22 | TSENT | TSENT is set when the TAC passes the token. It does not care whether a piggyback or explicit token pass frame is sent. TSENT is cleared when the TAC receives the next frame. |
| SR23 | RETRY | An internal flag which is set when either a data frame or a token pass frame must be retransmitted. Data frames are only retransmitted if they have an acknowledge request and an acknowledgement was not received. Token pass frames are retransmitted if no network activity was detected unless the TAC is in the scan mode. |
| SR24 | ACKRQ | An internal flag is set during data frame transmission if the TAC has requested an acknowledgement for the specific frame. The TAC pauses to await the ACK/NAK response frame; if the TA timer expires before the response, a single retry will occur (see RETRY SR23). ACKRQ is not cleared until the beginning of the next data frame transmission. |
| SR25 | TR | An internal flag is set when the TAC receives a token passed to it. It is cleared when the token is passed or if the token is ignored for any reason. |
| SR26 | NXTR0 | When this bit is set, it indicates the TAC has the address of the next buffer |

TABLE 8-continued

SR2 - STATUS REGISTER 2 DEFINITIONS

| BIT | SYMBOL | DESCRIPTION |
|---|---|---|
| | | and that all prior frames can be removed from the chain. When NXTR0 is clear it indicates that the TAC has advanced to a zero link (end of chain). |
| SR27 | NXTT0 | When NXTT0 is set it indicates that the TAC has the address of the next frame to transmit in its internal register. However, when clear, it indicates that the transmit chain internal register points to the link field of the last buffer of the last transmitted frame. |

TABLE 9

IR0 - INTERRUPT REGISTER DEFINITIONS

| BIT | SYMBOL | DESCRIPTION |
|---|---|---|
| IR00 | ITD/M | Network dead or mode change (dual use). When the TAC is in Network state this bit is set to indicate no network activity has occurred before timer TD timed out. This bit will be set if the TAC transitions from the Network or the Diagnostic State to the Isolate State. The choice between the ITD and ITM interpretations is easily made based upon reading the ISOL (CR00) bit. |
| IR01 | ITA | Data Frame Transmission Unsuccessful. This interrupt indicates that a transmitted data frame with an acknowledge request was acknowledged. Either a NAK or no response after two transmissions will cause this. The exact cause can be determined by inspecting the appropriate FSB. |
| IR02 | ITOK | This bit is set when the token has been received. |
| IR03 | IREC | Data Frame Received. This interrupt signifies that a good data frame has been properly received and DMA'ed into the buffer chain. |
| IR04 | ITRAN | This bit indicates that at least one data frame has been transmitted. |
| IR05 | INS | New successor. The TAC has identified a new successor (new address in NA) in the logical loop. This bit is set if the previous successor failed to respond to a token pass or if the TAC received a frame that caused the TAC to scan for the successor. |
| IR06 | IROR | Receiver over-run. The TAC ran out of buffers or the TAC was denied access to the host's bus by the host for too long causing a loss of received data. |
| IR07 | ITUR | Transmitter under-run. The TAC was delayed access to the DMA channel by the host long enough to cause the loss of transmitted data. The frame is not retried and the token is passed. |

INTR* goes low if any of these bits are set, causing an interrupt unless NOINT (CR01) has been set.

TABLE 10

OTHER VISIBLE REGISTERS DEFINITIONS

| SYMBOL | DESCRIPTION |
|---|---|
| CTR0 | Running Limit Counter. Used by the TAC for Access Hold-Off Limit (AHOLT) checking and Transmit Limit (TXLT) checking. When transmitting data frames, CTR0 is used for TXLT counting; otherwise it is used for AHOLT counting. The counter runs from zero to the 8-bit limit value. |
| NA | Next Address. This register shows the curent (instantaneous) successor node in the network logical ring. The successor |

TABLE 10-continued

OTHER VISIBLE REGISTERS DEFINITIONS

| SYMBOL | DESCRIPTION |
|---|---|
|  | node may be changed for a variety of reasons. |
|  | 1. Any attempted token pass that fails twice will cause the TAC to attempt to locate a new successor by sequentially trying token passes to successively higher node addresses beginning with NA+1. |
|  | 2. A received Scan frame will cause NA to be set to MA+1. If the next token pass fails case one above applies. |
|  | 3. The host may arbitrarily redefine NA by using the NAR register and the NEWNA (CR10) control bit. At a convenient point the TAC recognizes NEWNA, copies NAR into NA, then clears NEWNA as confirmation. If the next token pass fails case one above applies. |
| TAL | Acknowledgement Timer Limit. This register has the value of the maximum allowed time between frame transmission and ACK/NAK (if requested), or between token sent and network activity. The delay is in increments of 64 times the period of the clock CLK. If the clock rate is 2MHz, then TAL may be set in increments of 32 microseconds (range of 32 micro seconds to 8.2 milliseconds). |
| TDL | Network Dead Timer. This register has the value of the maximum time without activity on the network. Same clock source as TAL and the range is 1 millisecond to 262 millisecond. TDL must be greater than TAL. |
| CBP(H,L) | Control Block Pointer. A sixteen-bit pointer that points to the TAC control block in the host's memory. CBP must not be modified while the TAC is in the network mode. (Hereafter, when two registers or addresses are used to access one sixteen bit address, they will be denoted by xxx(H,L).) |
| NAR | Next Address, Request. This register is used in conjunction with the NEWNA (CR10) control bit to cause the TAC to update the NA register. NAR is loaded by the host and the host sets NEWNA. This redefines the node's successor in the network's logical ring. The acceptance of this update is confirmed when the NEWNA control bit is cleared. |
| AHOLT | This register is set at a value indicating the number of access cycles (tokens received) that must be skipped before a data frame may be transmitted. This register is initialized to zero upon Master Reset going low. |
| TXLT | This register is set at the maximum number of consecutive data frames the TAC may transmit during one access cycle. A value of zero allows the TAC to transmit all frames queued up to 256. This register is initialized to zero upon Master Reset going low. |
| MA | My Address. The TAC receives only frames with this destination address (along with the broadcast address) and inserts this address into the SA field of any transmitted frame. My address must be set by the host (range is one to two hundred fifty-four 254). |

Hereafter, when two bytes are combined to form a sixteen-bit address, they will be denoted by xxx(H,L) instead of xxxH and xxxL.

Tables 11–14 illustrate the functions of the Invisible Registers. The bits are numbered, with the most significant bit being 7 and the least significant bit being 0. Bits that do not presently have a use are omitted.

TABLE 11

SR3 STATUS REGISTER 3

| BIT | SYMBOL | DESCRIPTION |
|---|---|---|
| SR30 | N2Z | This bit is set when either TA or TD timeout. |

TABLE 12

ENTRR ENABLE TRANSMITTER RECEIVER REGISTER

| BIT | SYMBOL | DESCRIPTION |
|---|---|---|
| ENTRR3 | ETMI | When this bit is set, the transmitter will be enabled to increment registers DMAL and DMAH. |
| ENTRR2 | ERMI | When this bit is set, the receiver will be enabled to increment registers DMAL and DMAH. |
| ENTRR1 | ENR | When this bit is set, the receiver 100 (see FIG. 5) is enabled. |
| ENTRR0 | ENX | When this bit is set, the transmitter 102 (see FIG. 5) is enabled. |

TABLE 13

TCR TRANSMITTER CONTROL REGISTER

| BIT | SYMBOL | DESCRIPTION |
|---|---|---|
| TCR7 | THREX | When this bit is set, it indicates the transmitter holding register is empty and the TAC can do another DMA. |
| TCR6 | TUR | When this bit is set, it indicates a transmitter under-run has occurred. |
| TCR5 | FLAGX | When this bit is set, the transmitter will transmit flags. |
| TCR4 | ABORT | When this bit is set, the TAC aborts the transmission. |
| TCR3 | NOI | This bit is set to indicate that there is no information in the field. |
| TCR1 | XMIT | When this bit is set, the DMA is enabled. |
| TCR0 | XRDY | This bit is set to inform the microcontroller the transmitter is ready to send a frame. |

TABLE 14

RCR RECEIVER CONTROL REGISTER

| BIT | SYMBOL | DESCRIPTION |
|---|---|---|
| RCR5 | RORUN | When this bit is set, there is a receiver under-run. |
| RCR4 | RIF | This bit is set if there is an information field in a frame. |
| RCR3 | RROV | When this bit has been set, the receiver overflowed. |
| RCR2 | B2 | This bit is set if the flag at the end of a frame is received. |
| RCR0 | B0 | This bit is set if the flag at the start of a frame is received. |

B. Transmission Format and Buffers

1. Transmission Format

Information that is transmitted or received on the bus must have a specified format. Frames are used that are quite similar to the industry standard high-level data link control (HDLC). Each frame begins and ends with an eight bit pattern called a flag. This pattern consists of a zero, followed by six consecutive "ones," and terminates with a zero. Each frame also has a sixteen-bit Frame Check Sequence (FCS) to allow the TAC to determine whether a frame was correctly transmitted.

Currently the industry standard cyclic redundancy check (CRC) procedure is used to create the FCS.

There are three different types of frames used with this token protocol. The first is the frame used for sending data from one node to another and this type of frame is called a data frame. The second type of frame is used for adding nodes to the network and confirming whether a node received a transmitted frame. This type of frame is called an Access Control Frame. The third type of frame is used for passing the token from one node to another node. This is called an explicit token control frame. A data frame can also be used for passing the token to any node including the node that receives the data frame. This method for passing the token is called a piggyback token pass.

The data frame format is:

F-TC-DA-SA-I-FCS-F.

Field Names:
F = Flag (binary pattern 01111110)
TC = Token Control (8 bit)
DA = Destination Address (8 bit)
SA = Source Address (8 bit)
I = Information Field (0 to 4095 bytes or 16 buffers whichever is less)
FCS = Frame Check Sequence (16 bit)

The Access Control Format is:

F-DA-AC-FCS-F

Field Names:
F = Flag (binary pattern 01111110)
DA = Destination Address (8 bits)
AC = Access Control Field (8 bits)
FCS = Frame Check Sequence (16 bits)

An explicit token control frame format is:

F-TC-FCS-F

Field Names:
F = Flag (binary pattern 01111110)
TC = Token Control (8-bit)
FCS = Frame Check Sequence (16-bit)

Table 15 gives the functions of the field descriptions. The field symbol is in the left-hand column and its function is in the right-hand column.

TABLE 15
FIELD DEFINITIONS

| SYMBOL | DESCRIPTION |
|---|---|
| TC | The token control byte has the dual purpose of transferring permission to transmit between nodes and conveying a request for an immediate acknowledgement of a frame by its intended receiver. There is no interaction between the TC field and the DA or SA fields. Thus the token may be transferred to one node and data sent to the same or a different node, with one single frame. The value entered into the TC field is determined by the TAC and does not appear in the buffer (except for transparent frames). |
| | TC Value  Meaning |
| | 0  Token not passed at this time. |
| | 1-254  After current frame, token belongs to node TC. |
| | 255  Immediate ACK requested; Token not affected. |
| DA | Destination address. A value of |

TABLE 15-continued
FIELD DEFINITIONS

| | |
|---|---|
| | 1 to 254 indicates the destination address of the frame. The value 255 is the global (or broadcast) address. |
| SA | Source address. The values of 0 and 255 are reserved. A value of 1 through 254 is the address of the node transmitting the frame. |
| I | Information Field. The host defines the format and content. |
| FCS | Frame Check Sequence. The FCS calculation includes all data between the opening flag and the start of the FCS, except for 0's inserted for transparency. The sixteen-bit FCS is compatible with the standard HDLC FCS. |
| AC | Access Control. This field contains supervisory information. This field may be sent as a command using transparent mode or received in response to an acknowledgement request. Its format is shown below: |

| AC-CESS | CON-TROL | FIELD | | | | | |
|---|---|---|---|---|---|---|---|
| BIT# | 8 | 6 | 5 | 4 | 3 | 2 | 1  0 |
| Name | SCANF | WIR-ING | 0 | 0 | 0 | NVAL2 | -NVAL1-NVAL0 |

Table 16 defines the functions of the individual bits in the Access Control Field. The bits are numbered, with the most significant being bit number 7 and the least significant bit being bit number 0.

TABLE 16
ACCESS CONTROL FIELD

| BIT | SYMBOL | DESCRIPTION |
|---|---|---|
| 7 | SCANF | Scan Mode (Command). If this bit is set, it indicates that the addressed node(s) must redefine NA to equal MA + 1 for use on its next token pass. |
| 6 | WIRING | Wants in ring. This bit indicates the node that transmitted that frame is not in the logical ring but would like to be. It is the logical function of the transmitting node's GIRING AND NOT INRING. (CR13 AND SR20) The receiving TAC does not act on this information but merely passes it to the host via the received frame's FSB |
| 5-3 | — | Reserved. |
| 2-0 | NVAL | An encoded acknowledgement response. The receiving node will set one of the following codes depending upon the state of the last received frame: |
| | | 000—No error |
| | | 001—Insufficient buffers for frame |
| | | 010—Receiver not enabled at frame start |
| | | 011—Receiver overrun |
| | | 100—Frame exceeded 16 receive buffers |

In order to avoid having the host format the messages, certain functions are lodged in the receiver and transmitter. Because the TAC will treat all sequences of six successive "ones" as a flag, the transmitter must insert a zero after five successive "ones." Corresponding to this zero insertion, when the TAC is receiving a frame, zeros must be deleted from the frame following any sequence of five "ones." The Frame Check Sequence is generated by the transmitter and it is checked by the receiver. Zero insertion and deletion and the Frame Check Sequence generation and verification are well known in the industry.

2. The Memory Buffer Structure

The token access controller uses a complex memory buffer architecture to allow it to respond to real time problems with respect to its network obligations (e.g., meeting network data and process delay requirements). These memory structures are managed cooperatively by the host and its associated TAC. Memory management functions requiring a real time response (e.g., traversing a chain of buffers in memory) are handled entirely by the TAC. Other non-time critical operations are the responsibility of the host. The TAC does not store any data that has been received or any data that will be transmitted. Instead, the host creates transmit and receive buffers. Access to these buffers is accomplished through a control block. The control block is set up as shown in Table 17 in the host's memory. The address location given in Table 17 is the offset from the address stored in the Control Block Pointer, CPB(H,L), by the amount indicated in the left hand column.

TABLE 17

| CONTROL BLOCK | |
|---|---|
| Address | Function |
| 0 | NXTRH |
| 1 | NXTRL |
| 2 | NXTTH |
| 3 | NXTTL |
| 4 | BSIZE |
| 5 | EVT0 |
| 6 | EVT1 |
| 7 | EVT2 |
| 8 | EVT3 |
| 9 | EVT4 |
| 10 | EVT5 |
| 11 | EVT6 |
| 12 | EVT7 |
| 13 | EVT8 |
| 14 | EVT9 |
| 15 | EVT10 |

The location of the control block is written into the registers CBPH and CBPL (CBP(H,L)). Because the addresses for the host's memory are sixteen bits and the internal registers of the TAC are only eight bits, two registers must be used for each memory address. There are sixteen separate memory addresses allotted to the control block.

The lowest addresses in the control block (which are CBP(H,L) plus 0 and CBP(H,L) plus 1) give the address for the start of the receive buffer chain NXTR (H,L). NXTR(H,L) is usually stored in the TAC's registers nxtr(H,L). The next two bytes in the memory are allocated to the address of the transmit buffer chain NXTT(H,L). NXTT(H,L) is usually stored in the TAC's registers nxtt(H,L). CBP(H,L) plus 4 indicates the size of the buffer (BSIZE). The buffer size is the four least significant bits in BSIZE plus one times sixty four. Thus, the buffer size can range from sixty four bytes to one thousand and twenty-four bytes. The values of NXTR(H,L), NXTT(H,L) and BSIZE are provided by the host.

The remaining locations in the control block are allocated to eleven separate event counters. These counters are used for informing the host how many times certain events have occured. The function of these event counters is shown in Table 18.

TABLE 18

| EVENT COUNTERS | |
|---|---|
| Counter | Description |
| 0 | This counter is incremented whenever the TAC receives an access control frame with the SCANF bit set. |
| 1 | This counter is incremented whenever the TAC receives an acknowledgement indicating that the first transmission of the data frame failed but the second transmission succeeded. |
| 2 | This counter is incremented whenever an attempt to transmit the frame is aborted due to a transmitter underrun or the length of the frame exceeded 16 buffers. |
| 3 | This counter is incremented whenever the TD timer times out. |
| 4 | This counter is incremented whenever an access control frame or a token pass frame is incorrectly received. |
| 5 | This counter is incremented whenever the receiver detects an error due to an FCS error, the SQ* line indicates a bad signal, an incomplete frame was received, or a data frame was received when an access control frame was expected. |
| 6 | This counter is incremented whenver the TAC receives a Not Acknowledge Access Control Frame (NVAL0-NVAL2 is not set to 0). |
| 7 | This event counter is incremented whenever the TAC is expecting an acknowledgement access control frame and it receives another type of access control frame or a token pass frame. |
| 8 | This counter is incremented whenever the TAC detects a duplicate token. |
| 9 | Reserved |
| 10 | This counter is incremented whenever the TAC perceives that another node has the identical address. Duplicate addresses are detected whenever the TAC reads a source address that is equal to the TAC's MA register. |

Figure 6:
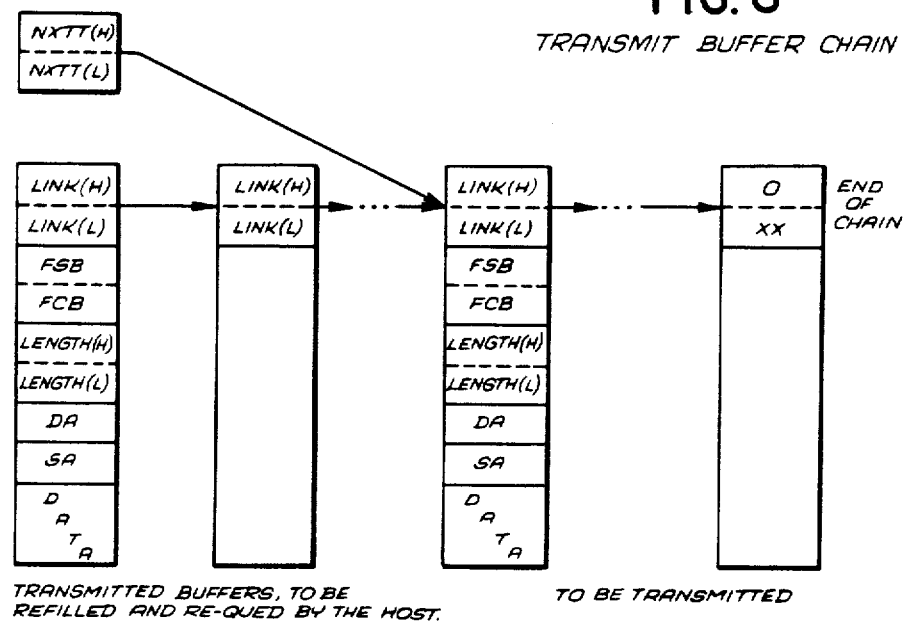
FIG. 6 is a diagram of the transmitter buffer chain.

The implementation of the transmit buffers, which are set up by the host, is shown in FIG. 6. The first two bytes in these buffers contain the address of the next buffer used as storage of data that should be transmitted (link). The next byte is the transmit frame status byte (TFSB). This byte is written by the TAC. Table 19 shows the functions performed by the transmit frame status byte (TFSB). The next byte in the buffer is the transmit frame control byte (TFCB). The host writes the TFCB. The functions of the byte are shown in Table 20. The next two bytes in the frame give the length of the frame (length). The length includes all the bytes in the frame, including the link size, the frame status byte, the frame control byte, the length bytes and all other bytes. The length bytes are followed by the destination address (DA), which is the node of the logical loop to which the TAC will send the frame contained in the buffer. The source address (SA) is the device sending the data. The remaining space in the buffer contains data bytes if there are any. Those buffers that are shown to the left of the buffer which NXTT(H,L) points to have already been transmitted and can be used by the host unless the link (H) value is 0.

The link always points to the next buffer to be transmitted. If a buffer is at the end of the chain, then the contents of that buffer's link (H) is set to zero. Thus, when the token access controller reads a zero as the content of a link(H), it knows that it has reached the end of the transmission chain.

TABLE 19

TRANSMIT FRAME STATUS BYTE

| Bit | Name | Function |
|---|---|---|
| 7 | DONE | This bit is set by the TAC when it is finished transmitting the frame. |
| 6 | WIRING | This bit is set to the corresponding value of the WIRING bit in the access control frame. |
| 5 | | Reserved |
| 4 | | Reserved |
| 3 | SELF | When this bit is set, it indicates that the three least significant bits were set by the TAC. Otherwise, the three least significant bits are copied from the three least significant bits of the access control frame. |
| 2-0 | VAL | The meaning of these three bits depends upon the value of SELF. When SELF is clear: 000—Frame successfully transmitted. 001—Insufficient buffers for transmitted frame. 010—The receiver was not enabled when transmission began. 011—The receiver could not DMA at a sufficient speed. 100—The frame was longer than 16 buffers in the receiver's buffer chain. When SELF is set: 000—No transmitter error. 010—The transmitter under-run condition was detected. 011—The end of the transmit buffer chain was reached. 100—The frame that was transmitted was longer than 16 frames. 001—The transmission failed. |

It should be noted that the VAL bits in the TFSB are determined by the TAC that received this frame when SELF is clear. VAL is determined by this TAC when SELF is set. Thus the receiver mentioned in the description of VAL is the receiver of the destination while the transmitter mentioned when SELF is set is the transmitter of this TAC.

TABLE 20

TRANSMIT FRAME CONTROL BYTE

| Bit | Name | Description |
|---|---|---|
| 7 | WACK | When this bit is set, the TAC will not transmit another frame until it receives an access control frame or the TA timer times out. |
| 6 | FCBLF | The TAC will pass the token at the end of this frame. |
| 5 | TRANSP | The TAC will interpret this buffer to be the exact sequence of bytes to be transmitted. The TC and SA generation functions will be suppressed. |
| 4-0 | | Reserved. |

Figure 7:
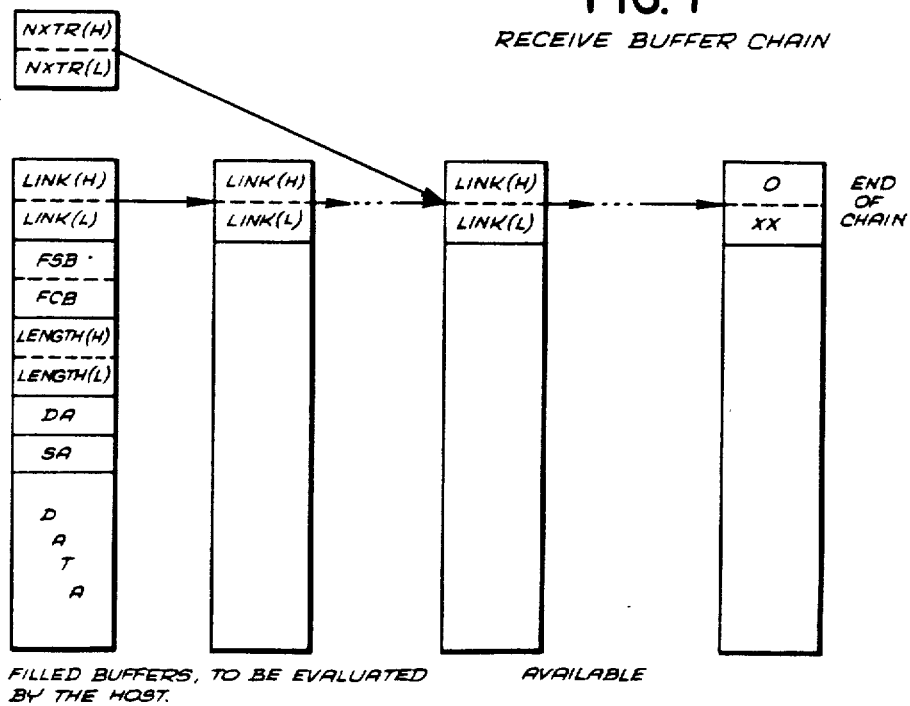
FIG. 7 is a diagram of the receiver buffer chain.

The receive buffer chain structure is quite similar to the transmitter buffer chain. See FIG. 7. NXTR(H,L) points to the next buffer available for frames received by the TAC. The first two bytes of the buffer link(H) and link(L) contain the starting address of the next buffer. There is a receiver frame status byte RFSB. When the most significant bit, which is called DONE, has been set by the TAC, that means that a valid frame has been written into the memory (DONE=1). The other bits are not currently used. There is also a receive frame control byte RFCB, which currently has no function. The next two bytes length(H) and length(L) indicate the length of the buffer. Next is the DA (destination address) which should always be either equal to MA of the TAC that received this frame or equal to the global broadcast address two hundred fifty-five unless COPY (CR2) is set. After the DA is the source address (SA), which is the address of the node that sent this frame. The remainder of the frame is information. Those buffers to the left of the buffer that NXTR(H,L) points to are already filled with information and will be evaluated by the host.

C. The Flow Charts

Figure 8:
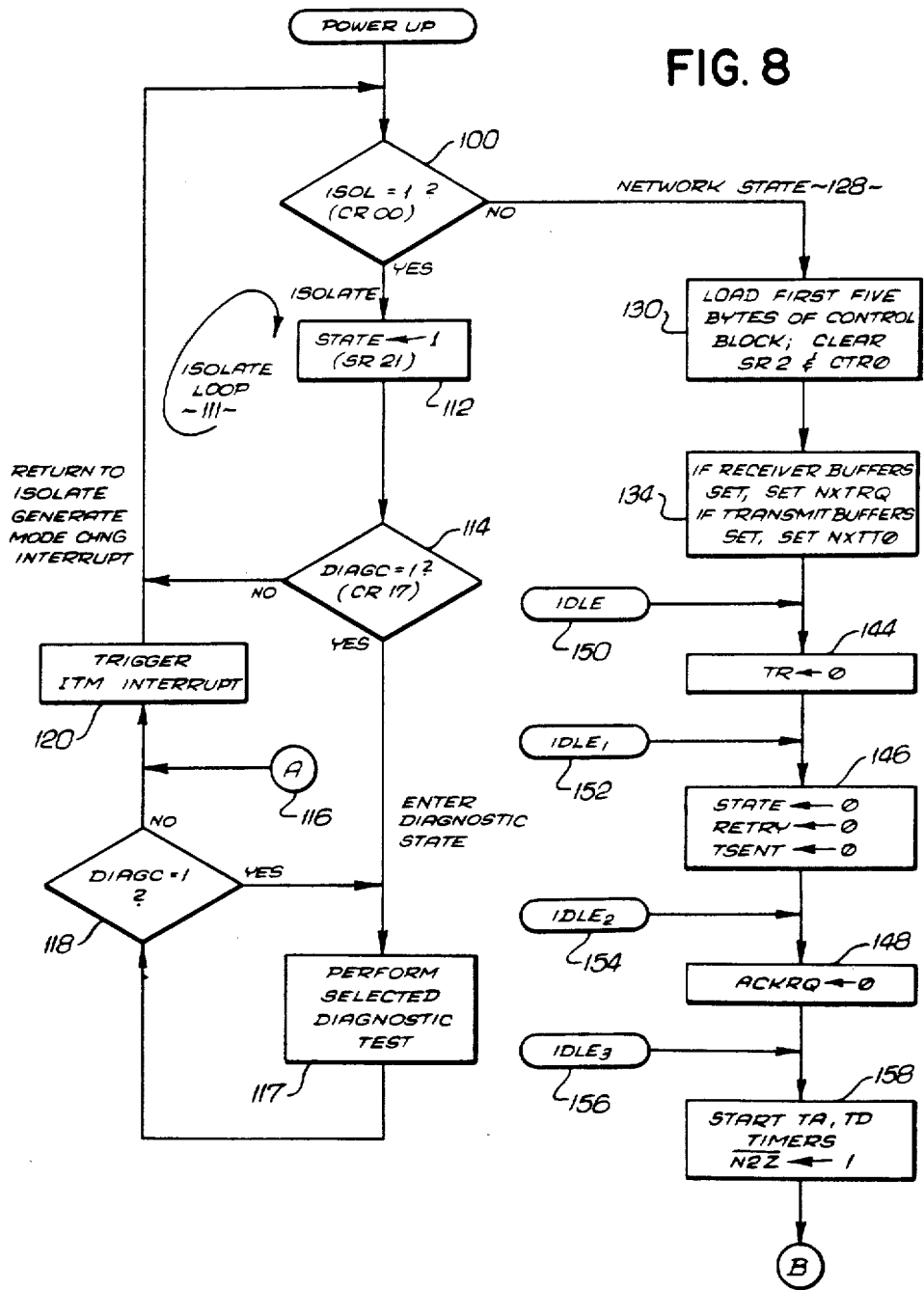
Figure 9:
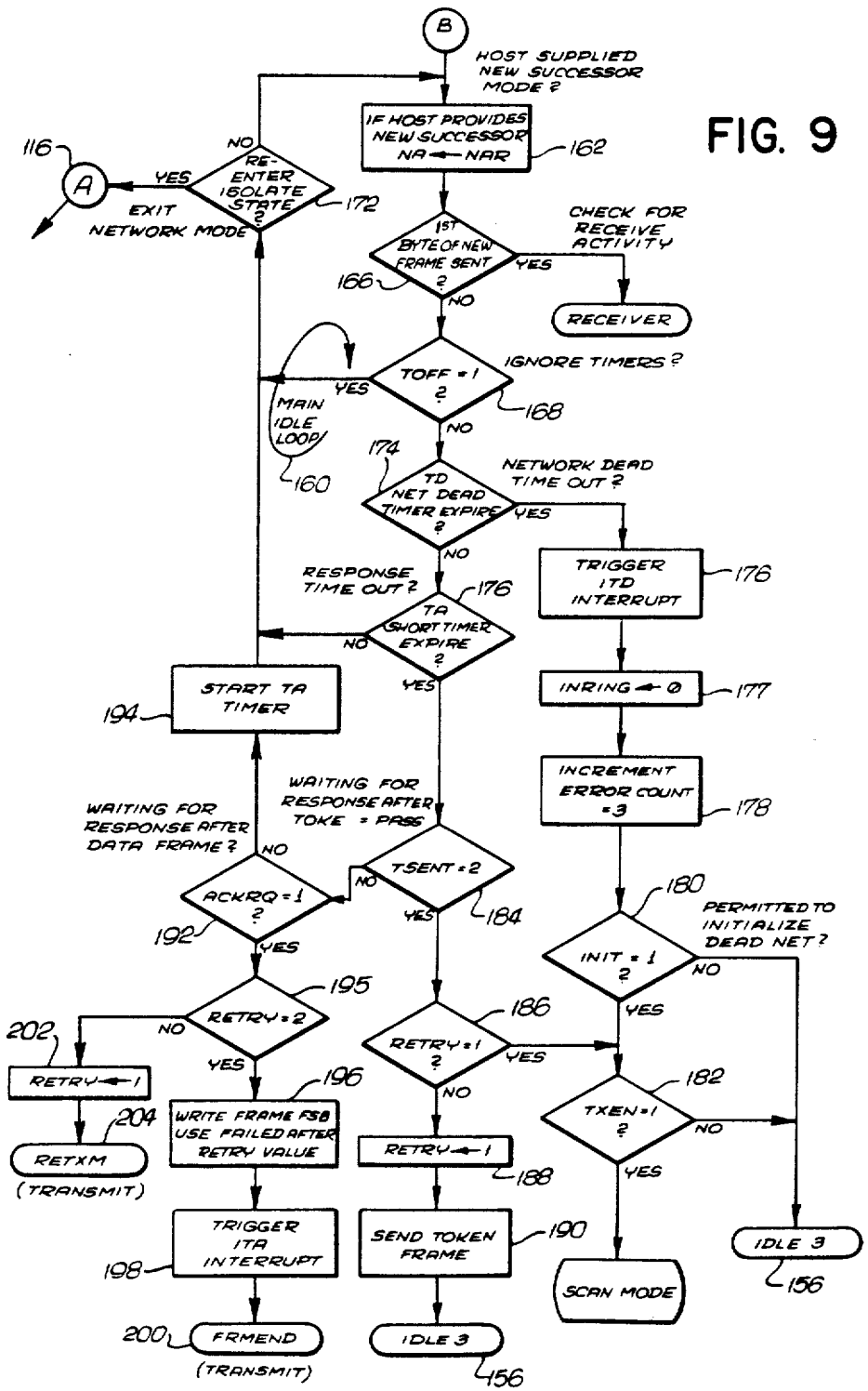
Figure 10:
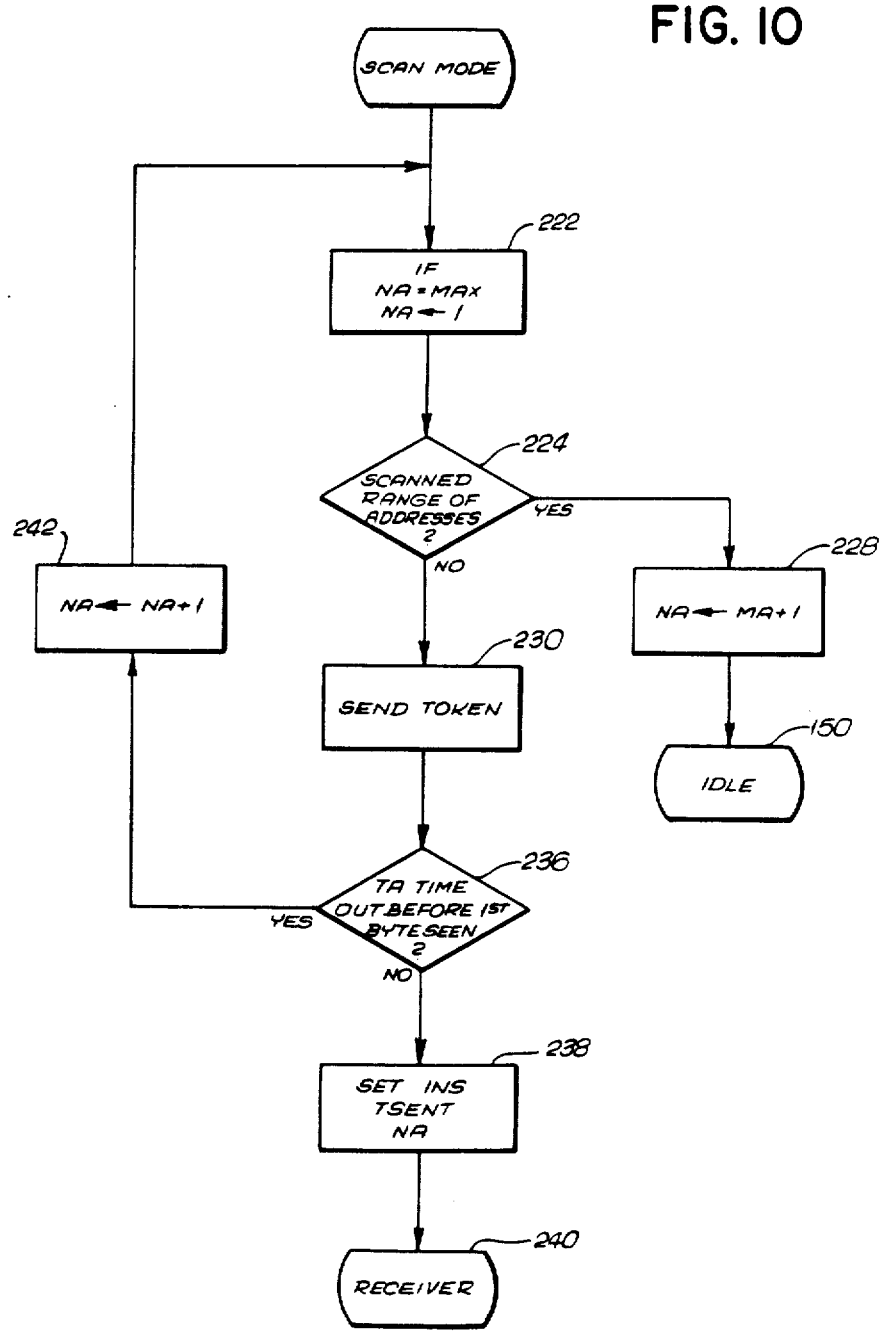
Figure 22:
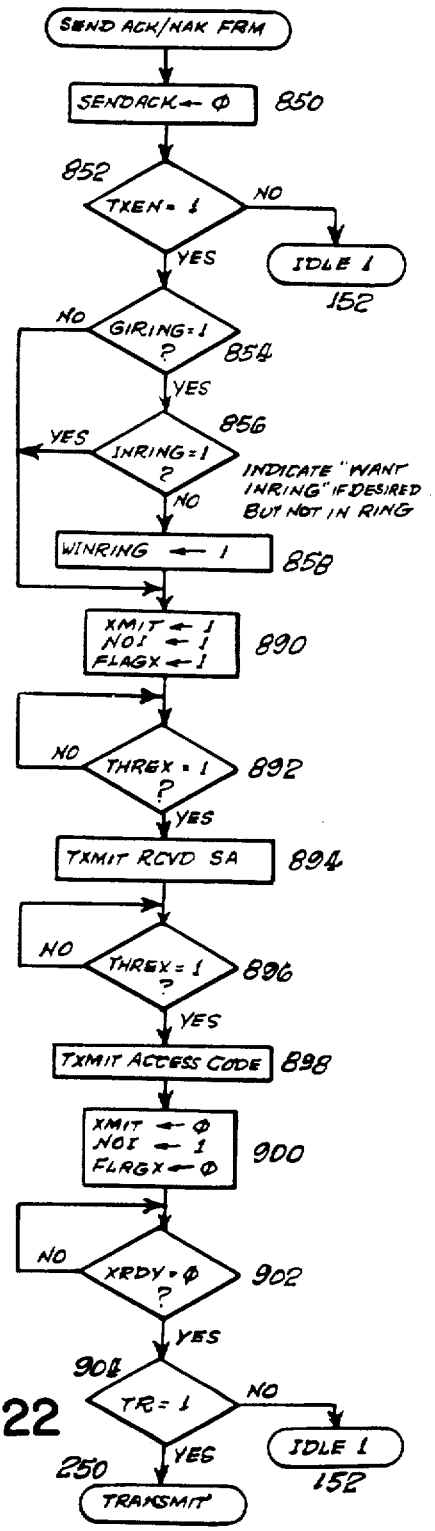
Figure 23:
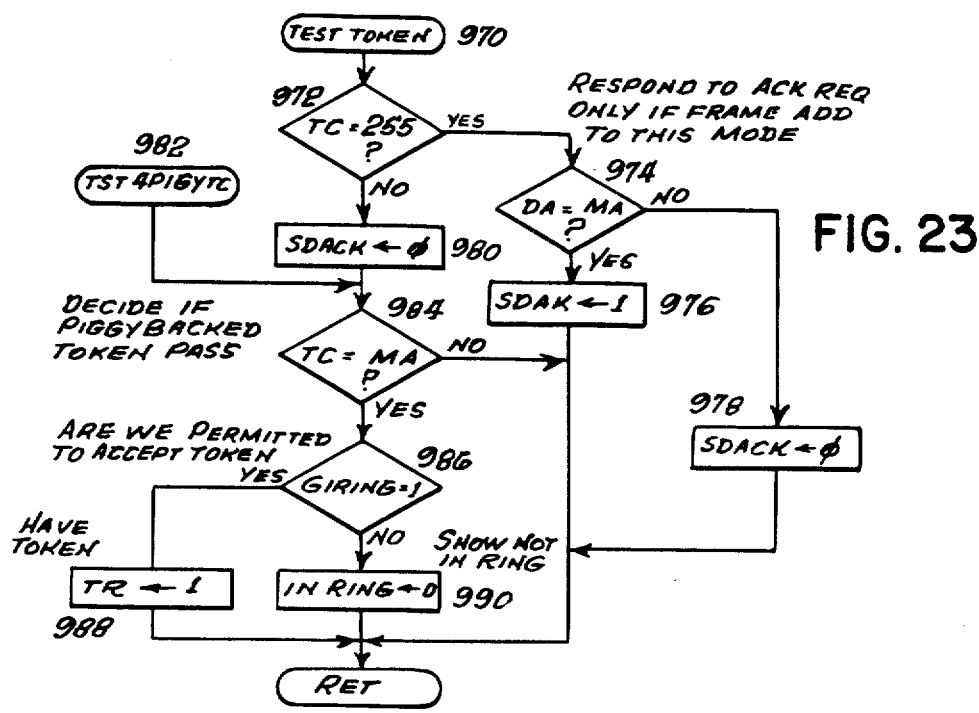
Figure 24:
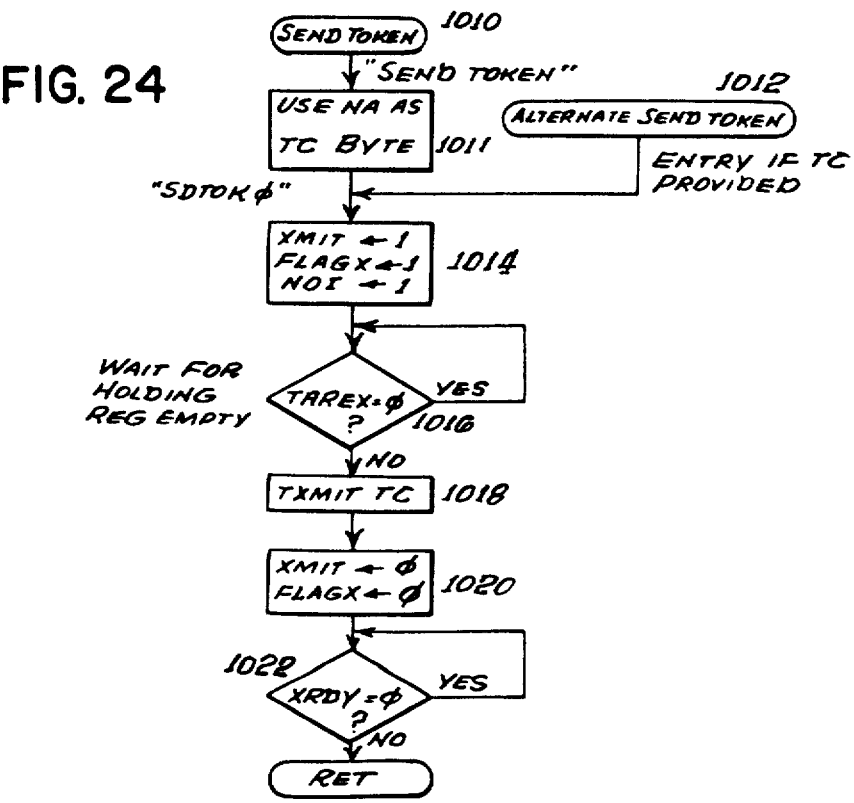

FIGS. 8 through 24 are the flow charts for the TAC protocol. FIGS. 8 through 10 are the executive flow charts. FIGS. 11 through 15 are the flow charts for transmission of frames. FIGS. 17 through 21 are the flow charts for reception of frames. FIGS. 23 and 24 are flow charts for various subroutines. The TAC has three states: Isolated, Diagnostic, and Network.

When power is turned on the TAC is automatically in the Isolated state. In step 110, upon powering up, the microcontroller 70 checks to determine whether the TAC is on the network or is in the Isolated state, by checking to see if CR00 is set. If CR00 is set, the TAC is in the Isolated state 111 and STATE (SR21) is then set to "one" in step 112. In step 114, the microcontroller 70 then goes to see whether DIAGC=1 (CR17). This bit is set by the host if it desires the TAC to check itself by performing one of several diagnostic states. If DIAGC has not been set, the TAC will stay in the Isolated state and the microcontroller 70 will loop back to wait for a change in either ISOL (CR00) (Step 110) or DIAGC (CR17) (Step 114).

If DIAGC (CR17) is set, the TAC enters the diagnostic state (115) and the microcontroller 70 performs the diagnostic test or tests that have been selected by the host and stays in the Diagnostic state until DIAGC is cleared. If DIAGC is cleared, (118) ITM is set to inform the host that the TAC has changed states (120).

When ISOL (CR00) is cleared by the host, the TAC will enter the Network state (128). Upon entering the Network mode, the first five bytes of the control block (Table 17) are loaded into the appropriate registers 78 of the TAC (130). The four least significant bits of BSIZE must be loaded into the four least significant bits of SR0 (BSZ3-BSZ0) so the TAC knows how long each transmitter and receiver buffer is. The contents of NXTT(H,L) and NXTR(H,L) are loaded into nxtt(H,L) and nxtr(H,L) respectively (130). Next, status register 2 (SR2) and counter register 0 (CTR0) are initialized (130).

Next, the TAC must determine whether the transmit and receiver buffers are already set up (134). If the receiver buffer are established (nxtrh is not equal to zero), then NXTRO is set. If the transmitter buffers are established (nxtth is not equal to 0), then NXTO is set. Next TR (SR25) is cleared to indicate that no token has been received, (144) and also STATE (SR21), RETRY (SR23) and TSENT (SR22) are all cleared (146). STATE must be cleared to confirm that the TAC is now in network mode. Next, ACKRQ must be cleared to indicate no acknowledgements have been requested (148). There are also "jump to" points represented by IDLE (150), IDLE1 (152), IDLE2 (154), and IDLE3 (156). These "jump to" locations are points in the flow chart that the microcontroller will jump to upon certain conditions. After these steps, the TA and TD timers must be started and N2Z* must be set to indicate that none of the timers has timed out (158).

There are two timers on the TAC. One is used as a timer for acknowledgements (TA 96) and the other is used to determine whether the network is dead (TD 98). If there is no activity on the network (including the passing of tokens) before TD 98 reaches the limit set in the TDL register, this means the network has ceased functioning. As will be explained later, if the TD timer times out, then the TAC tries to reestablish the network. The TA timer is used to time for acknowledgements. If an acknowledgement is requested in the transmit frame control byte (WACK=1) the TAC will not transmit another message until either TA times out or an acknowledgement is received. In addition, N2Z (SR30) is set to indicate neither time has timed out yet. Of course, if TOFF (CR04) is set, the TAC ignores the timers.

The TAC now enters the main idle loop (160). (FIG. 9). In this loop, the TAC waits for activity to be detected on the network or for one of the timers to time out.

The first thing that the TAC does is check to see if the host has supplied a new successor node. Therefore, it examines NEWNA (CR10). If a new successor node has been provided by the host processor, the TAC then loads NAR into NA and clears NEWNA (162). After clearing NEWNA or if NEWNA was not set, the TAC looks to see if the first byte of a new frame is detected by the receiver (166). The microcontroller does this by polling B0 (RCR0). If B0 is set, this means the first byte of a new frame has been detected, and the microcontroller 70 will jump to the Receiver Flowcharts (FIGS. 17-21).

If B0 is not set, the TAC will determine whether TOFF (CR04) has been set (168). If TOFF has been set, the TAC ignores its internal timers (TA and TD). Therefore the TAC will loop back to the start of the main idle loop (160). The only exception to this is if the host has requested the TAC to return to the Isolate state (ISOL=1) and this TAC does not have the token (172). Then, if ISOL is set and TR is cleared, the TAC will immediately enter the isolate state 111 at A (116) (FIG. 8).

If TOFF has not been set (168), the TAC will poll its TD timer to see if the network is dead (174); if TD has timed out, the TAC will try to reestablish the network.

If TD times out, the microcontroller 70 sets ITD (IR00), which automatically causes INTR* to go low unless NOINT (CR01) has been set (176). INRING (SR20) is cleared to indicate that the TAC is no longer in an operative logical loop (177). Event Counter No. 3 will be incremented by one (178).

The TAC whose TD has expired will poll INIT (CR15) to determine whether it is allowed to reestablish the network (180). If the device is not allowed to reestablish the network, then the microcontroller 70 jumps to IDLE3 (156) and restarts TA and TD timers. If the device is allowed to initialize the network (INIT=1), the next step (186) the TAC does is check to make sure that its transmitter is enabled by polling TXEN (CR06). If TXEN is not set, that means that this TAC is not allowed to transmit so it cannot restart the network. Therefore, the microcontroller 70 will jump to IDLE3 (156) and reset the TA and TD timers. If TXEN is set, then the TAC will attempt to reestablish the network by entering the scan mode shown in FIG. 10.

The scan mode causes the TAC to keep sending the token control frame onto the network to another node until the TAC receives a response. In scan mode, the microcontroller 70 loads the TAC's next address NA into the ACC 76 (Step 220) and determines whether NA is set to the maximum possible node address (222). If NA is set to the maximum possible node address (which is equal to "254"), then NA is set to one. If the address in the NA register is the same as the TAC's address (224), then that means the TAC has been unable to find a successor node. Therefore NA is set to MA+1 (228) and the microcontroller 70 jumps to IDLE (150) (FIG. 8). If NA is not equal to MA, the TAC will then send a token to the node whose address is in ACC 76 by using the SEND TOKEN subroutine (FIG. 24) (230). The TA timer is started (232) to await an acknowledgement. Then the TAC waits for any responding activity on the network. If the receiver detects any activity before TA times out (236) NA is set to the current contents of ACC, TSENT is set, and INS is set (238). The TAC jumps into the receiver mode (FIG. 17) to receive this next frame.

The scan mode can be used for polling or scanning for new nodes desiring to enter the logical loop. One or more of the host processors must be programed to perform these functions.

If no activity has been seen, then the TAC will check if the TA timer has timed out yet (236). If not, the TAC will continue to monitor the bus until either activity is seen (234) or the TA timer expires (236). If the TA timer expires, the ACC will be incremented by one and the TAC will jump to step 222.

Referring back to FIG. 9, if a response is being waited for after a token transmission (184), then the microcontroller 70 will poll RETRY to determine whether this is the first or the second time the token has been transmitted (186). If RETRY is set, that means that the token has been sent twice, which means the token has been lost. If RETRY equals "one," the microcontroller will jump to Step 182. If RETRY is not equal to one, that means the token has been passed only once. In that case, RETRY will be set (188), and a token frame will be transmitted to the node address identified in NA by the SEND TOKEN subroutine (190). The TAC will then go to IDLE3 (156) and restart the TA and TD timers.

If the TSENT is not set (184), then the microcontroller 70 will poll ACKRQ (SR24) to determine whether a response is expected after the last transmission of a data frame (192). If not, the TA timer will simply be restarted (194) and the microcontroller will reenter the main idle loop unless the host requested an exit from the network mode (172). If an acknowledgement request was requested (192), the microcontroller 70 will poll RETRY to determine whether the data frame transmission that is to be acknowledged was transmitted once or twice (195). If the second transmission has already been done (RETRY=1), then the TAC sets the transmit frame status byte (TFSB) to indicate the transmission failed after two attempts (196). An ITA interrupt is triggered by setting IR01 so the host knows that a data frame transmission was unsuccessful (198). The microcontroller jumps to the FRMEND (200) shown in FIG. 15.

If RETRY has not been set (195), then there was only one transmission of the data frame. Therefore, the microcontroller will set RETRY 202 and it will retransmit the frame by jumping to RETXM (204) to retransmit the data frame. The procedure for retransmitting is shown on FIG. 11.

Figure 17:
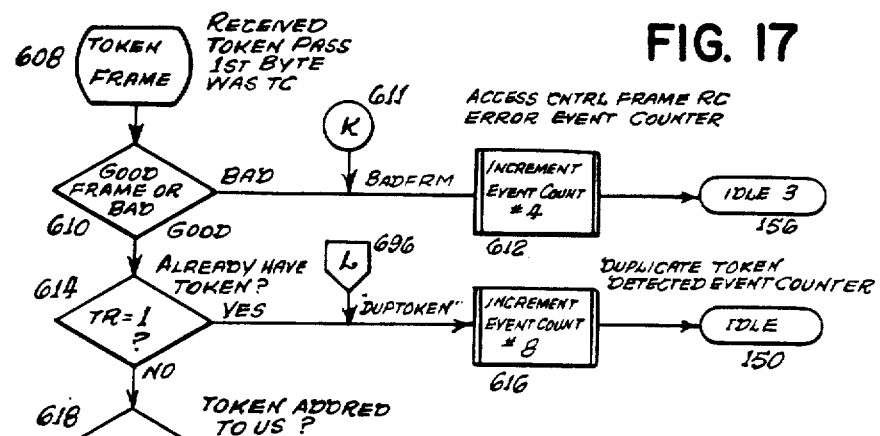
Figure 18:
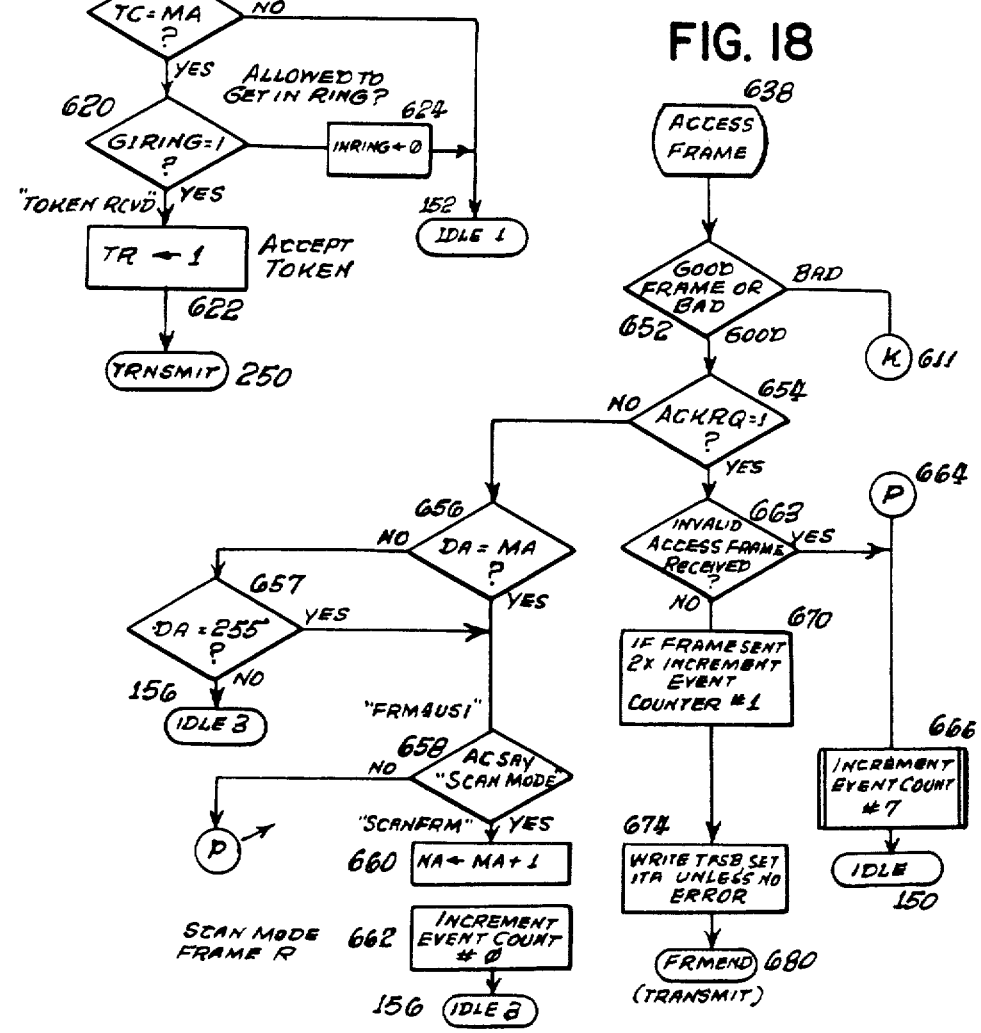

The receiver flowcharts are shown in FIG. 16 through 21. After receiving the first byte, the receiver microcontroller 88 sets B0 to inform the microcontroller 70 that the first byte has been received (600). The receiver microcontroller 88 handles all of the handshaking with the bus. Next, TSENT is polled to determine whether the token has just been previously passed (602). If TSENT is set, that means the token has just been successfully passed and TSENT will then be cleared, TR will be cleared and INRING will be set (604). If TSENT is not set, this step is skipped. Next, the receiver microcontroller (UR) 88 determines whether this is the frame end (606). The UR 88 can determine if the frame end has been reached by looking for the flag pattern. If the first byte of data is followed by two additional bytes and then the flag, that means that the first byte is a token and the next two bytes are the FCS because the only three-byte frame is a token control frame. If the receiver microcontroller 88 detects the flag at the end of the frame, it sets B2. The microcontroller 70 will examine the token to determine whether the token has been passed to this TAC at TOKEN FRAME (608) (FIG. 17).

The procedure for checking whether this token frame is passing the token to this TAC involves first checking to make sure that a good frame has been received (610). This is done by the receiver 100 checking the FCS using standard techniques and by examining the SQ* signal to determine whether the external bus's signal met a specified signal quality. If the frame is bad, Event Counter No. 4 is incremented to indicate a bad frame was received (612) and the microcontroller 70 jumps to IDLE3 (156) on FIG. 8.

If the frame is good, the TAC determines whether there is a duplicate token in the network. This is done by seeing if TR has been set (614). If TR is already set, there are duplicate tokens on the network and Event Counter No. 8 will be incremented to indicate this to the host (616). The microcontroller 70 will then jump to IDLE (150) on FIG. 8.

Figure 11:
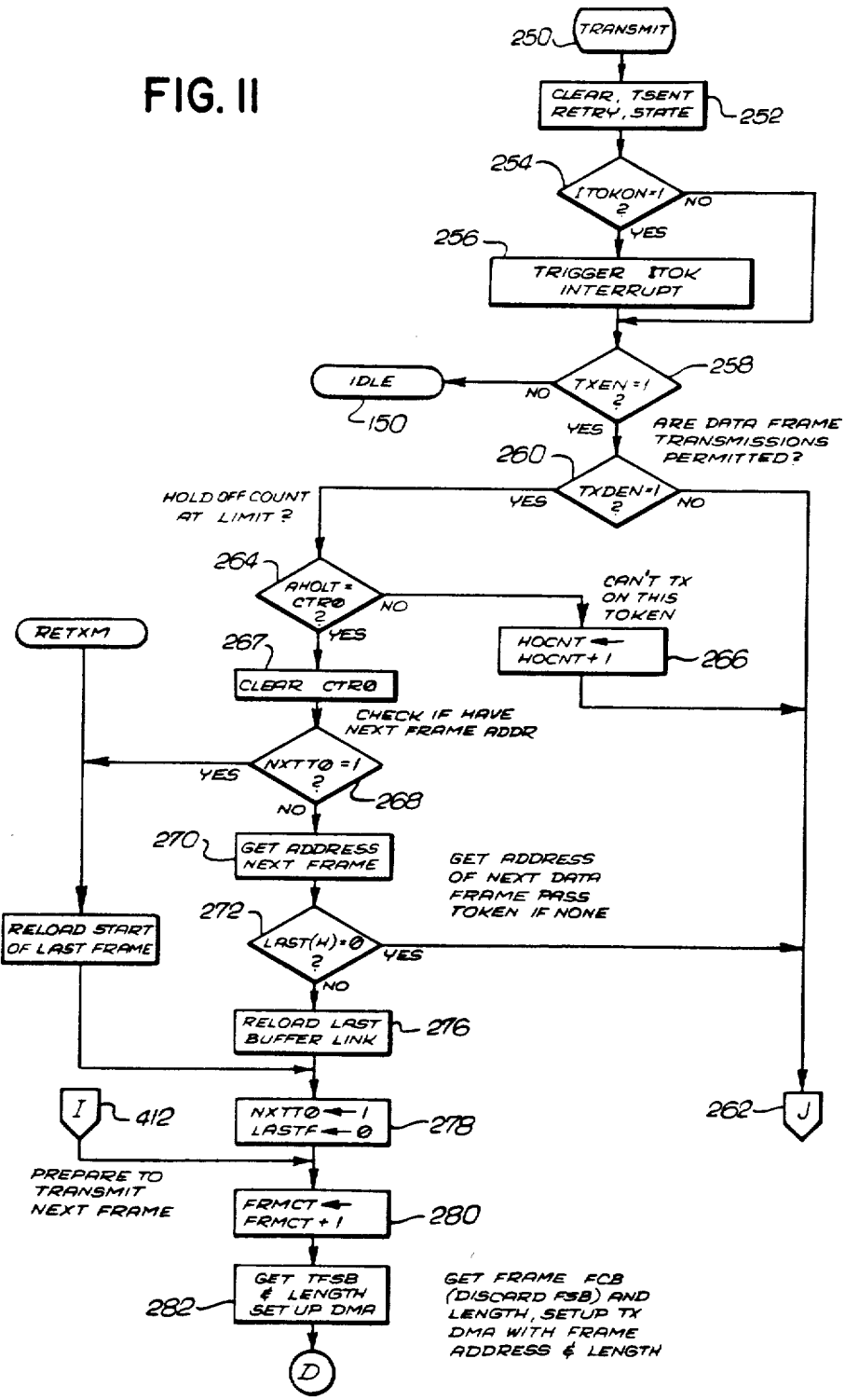

If the token is not a duplicate, it must be examined to see if it was addressed to this TAC. This is done by comparing the value of the received token with the contents of MA (618). If the token was not addressed to this TAC, then the TAC will jump to IDLE1 (152). If the token is addressed to this TAC, then GIRING is polled to see if it has been set (620). If GIRING is set, that means the TAC is allowed to access the logical loop and it will accept the token by setting TR (622). Then this TAC will jump to the transmit mode (250) (FIG. 11). If GIRING is not set, then INRING will be cleared to indicate that this TAC is not in the logical loop (624). The microcontroller will then jump to IDLE1 (152).

If the frame end has not yet been received (606), (FIG. 16) the TAC will then determine whether the second byte has been received (624). The receiver microcontroller 88 will continue to look for a flag and if the end of the frame is reached without a second byte, that means a token frame was transmitted. The TAC will jump to TOKEN FRAME subroutine (608) on FIG. 17.

If a second byte arrives, (632) the microcontroller 70 will then determine whether this is the frame end by polling B2. If B2 has been set, then the frame is an access control frame and the microcontroller 70 will jump to the ACCESS FRAME routine that starts at step 650 in FIG. 18. If a third byte is received (636) the microcontroller 70 gets the third byte, and indicates to the receiver microcontroller that the byte has been received 88 (Step 642). If the receiver 100 has received the third byte, the received frame is a data frame.

If an access control frame has been received (Step 638) (FIG. 18), the TAC will determine whether the access frame is good or bad. This is accomplished by examining the FCS and SQ*. If it is a bad frame, then the processor will jump to BADFRME (611) on FIG. 17, increment the appropriate event counter 612 and jump to IDLE3 (156).

If it is a good frame, the TAC will check to see whether this TAC has been waiting for an acknowledgement by polling ACKRQ (654). If ACKRQ is clear then the TAC has not been waiting for an acknowledgement. The TAC then checks to see if the destination address (DA) is equal to MA (656). If DA is not equal to MA, then the microcontroller 70 checks (657) to see if the DA is equal to the broadcast address (which is equal to two hundred fifty-five). If DA is not equal to the broadcast address, then the TAC will go back to IDLE3 (156) on FIG. 8 ignoring the frame.

If DA is equal to MA or DA equals the broadcast address, the access control byte will have its most significant bit polled to determine whether the access control frame commands this TAC to enter the scan mode (is SCANF set) when the TAC receives the token (658). If this bit is set, this indicates that the addressed node or nodes must redefine their NA to equal MA+1 (660) and enter the scan mode upon receipt of the token. Then Event Counter No. 0 is incremented (662). The microcontroller 70 then jumps to IDLE3 (156).

If DA=MA or if DA equals the broadcast address, and the SCANF bit of the access control byte has not been set, this means that an invalid frame was received. The microcontroller 70 jumps to P (664) and Event Counter No. 7 is incremented (666) and the microcontroller 70 then jumps to IDLE (150) on FIG. 8.

If ACKRQ has been set (654), this means that this TAC has been waiting for an acknowledgement. If an invalid frame is received, (663) Event Counter No. 7 will be incremented (668) and the TAC will jump to IDLE (150).

After determining that the frame is valid, the TAC polls RETRY to determine whether RETRY has been set. If RETRY has been set, then Event Counter No. 1 is incremented to indicate that the first transmsmission attempt of the data frame failed but the second transmission attempt succeeded (670). After incrementing Event Counter No. 1 or if RETRY had not been set, the Transmit Frame Status Byte (TFSB) value is calculated based upon the Access Control byte and the TFSB is written into the first buffer for the transmitted frame (674). The TAC then analyzes the access control byte to see whether there has been a transmission error. If there is an error, the ITA bit (IRO1) is set generating an interrupt to alert the host that the frame was improperly received by the destination node (674). At this point, the microcontroller 70 will then jump to FRMEND (680). (FIG. 15)

Figure 19:
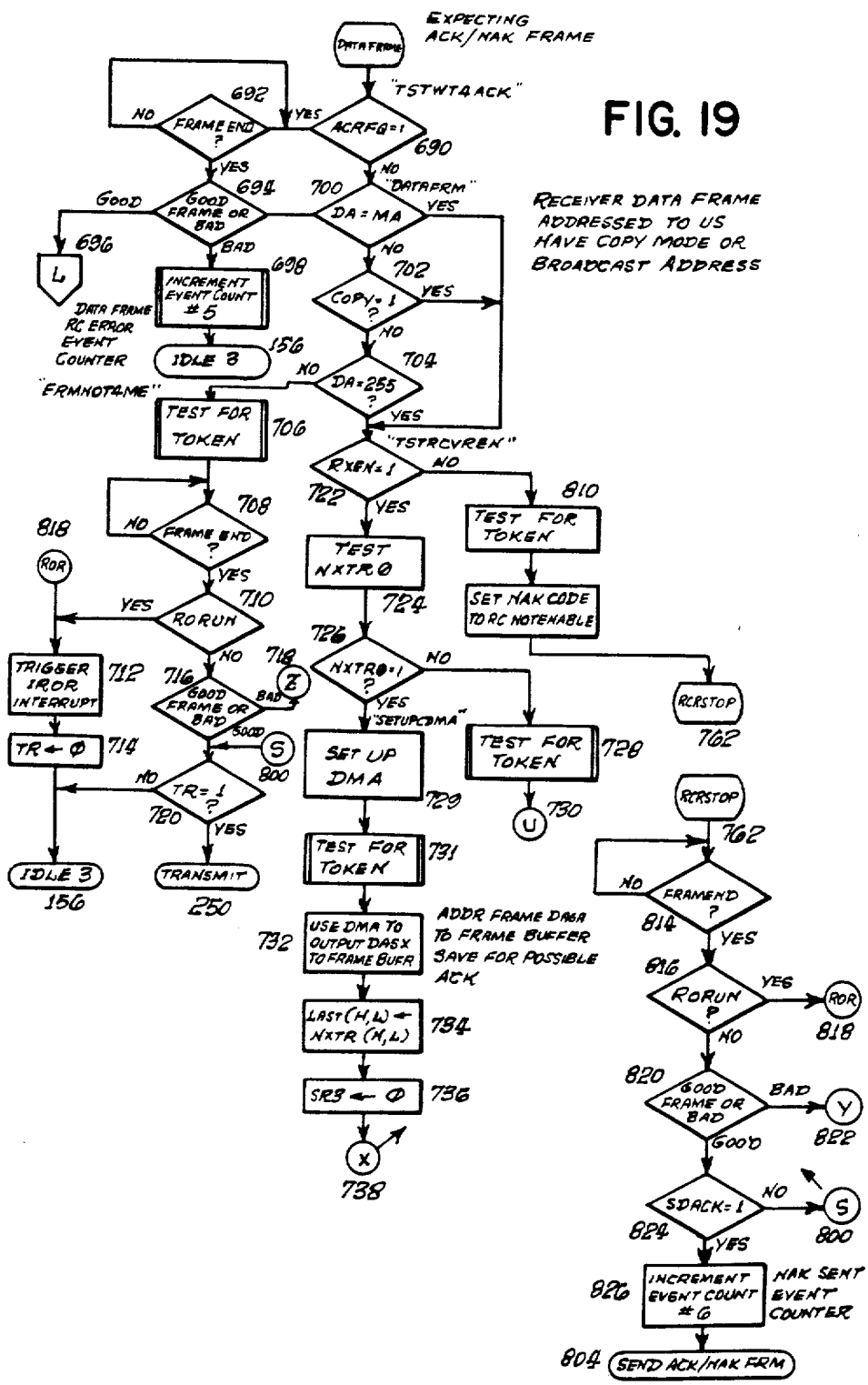

If a data frame has been sent, which means a third byte was found at step 642 (FIG. 16), the microcontroller 70 tests to determine whether it is expecting an acknowledgement frame (ACKRQ=1) (690) on FIG. 19. If ACKRQ is set, that means an invalid or bad frame was received and the TAC will wait to receive the end of the frame (692). If a good frame is received, 694 the TAC will jump to L (696) on FIG. 17 to inform the host that two tokens are on the network. If the frame is bad due to an error detected by the FCS or by SQ* (694) then Event Counter No. 5 will be incremented 698 to indicate a bad frame was received. The microcontroller 70 will then jump to IDLE3 (156).

If ACRKQ has not been set (690), the TAC will then examine the received data frame to determine whether the destination address (DA) equals MA (700), whether the TAC is in the copy mode (702) which mean this node copies all data frames on the buffer (CR02=1), or whether this is a broadcast frame (DA=255) to be received by all nodes on the network (704). If the answer to any of these is "yes," the TAC will then take further steps to receive the frame.

If the frame is not intended for this node, then the TAC will check to see whether it has received a token through a piggyback pass (706). After testing for the token, the microcontroller 70 will keep looking for the end of the frame, 708 and upon receipt, the microcontroller 70 will determine whether there is a receiver overrun by polling RORUN (RCR5) (710). If there is a receiver overrun, then the IROR (IR06) bit is set to cause an interrupt to the host to indicate that there was a receiver overrun (712). TR is then cleared to indicate that the TAC does not have the token (714). The microcontroller 70 then jumps to IDLE3 (156) on FIG. 8.

If there is no receiver overrun, the FCS and SQ* are checked to determine whether it is a good frame or a bad frame. If a bad frame is received, then the microcontroller 70 jumps to Z (718) on FIG. 21. Otherwise TR is polled (720) and if TR is set indicating a token was passed to this node, then the microcontroller will jump to transmit (250). If TR has not been set, then the microcontroller 70 will jump to IDLE3 (156) on FIG. 8.

If the TAC is supposed to receive the data frame (DA=MA, COPY=1, or DA=225), then the TAC will check RXEN (CR05) to determine whether the receiver is enabled (722). If RXEN is not set, the microcontroller 70 does the TEST FOR TOKEN subroutine (810). Then AX3 is loaded with the appropriate access control byte (812) to be sent to the node with the token if an Immediate ACK was requested. The microcontroller then performs the RCRSTOP routine (762).

In the RCRSTOP routine, the microcontroller waits for the frame end. RORUN is polled (816) and if it is set, the microcontroller jumps to ROR (818). If RORUN is clear, the FCS and SQ* are checked to determine if a bad frame has been received (820). If a bad frame has been sent, then the microcontroller jumps to Y (822) on FIG. 21. Otherwise SDACK is polled (824). If SDACK is set, then Event Counter No. 6 is incremented (826) and the microcontroller jumps to Send Ack/Nak FRM (804) to send the appropriate access control frame. Otherwise the microcontroller jumps to S (800) to see if the node has just been passed the token.

If the receiver is enabled (RXEN was set) (722), then the microcontroller 70 will test NXTRO, to ensure that the receiver chain is properly established (726). If the receiver chain has not been established, the microcontroller does the TEST FOR TOKEN routine (728), which is shown in FIG. 22 and then jumps to U (730) on FIG. 20.

If the receiver buffers are properly established (726) then the receiver will start inputting the data by using the DMA 82. To set up the DMA, DMA(H,L) is loaded with nxtr(H,L)+8. An internal receiver register LIM is loaded with the value of the buffer size minus 8, CTR0 is set to 8, and the receiver is enabled (ENR=1) (729). The TEST FOR TOKEN subroutine is then preformed (731). Then DA and SA are outputted to the receiver buffer so they can be saved for a possible acknowledgement. Next the contents of nxtr(H,L) is loaded into Last(H,L) (734). SR3, which is used as the register for the buffer count, is cleared (736).

Figure 20:
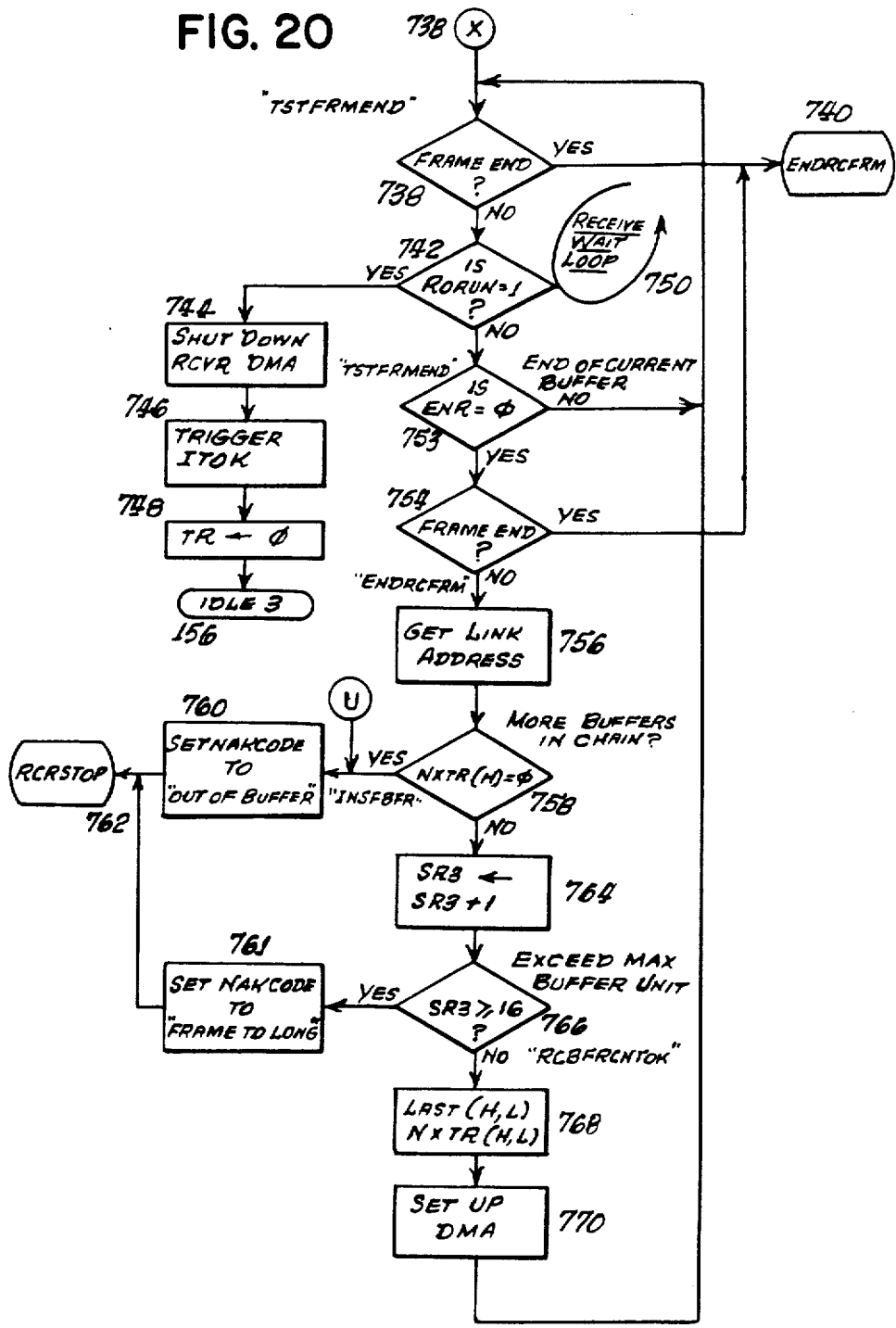

Next, the microcontroller 70 looks for the frame end (738) (FIG. 20). If a frame end is received, the microcontroller jumps to ENDRCFRM (740) on FIG. 21. However, if this is not the frame end, the microcontroller 70 examines the internal registers to determine whether the TAC was unable to DMA received data into the host's memory at a sufficient rate. (RORUN=1) (742). If there are not enough buffers, the receiver 100 is shut down (744), ITOK is triggered (746) and TR is cleared (748). The microcontroller 70 then jumps to IDLE3 (156) on FIG. 8.

If there is no overrun (742) the TAC remains in the Receive Wait Loop (750) and checks to see whether ENR is cleared (752). If ENR is cleared, that means that the end of the current buffer has not been reached by the DMA 82, so the TAC will continue to allow a DMA by the receiver microcontroller 88 until either the current buffer is finished or there is a frame end. If the end of the current buffer has been reached, then the microcontroller 70 tests for a frame end (754). If frame end has been reached, then the microcontroller 70 will jump to ENDRCFRM (740) on FIG. 21.

If the end of the current buffer has been reached (752) and this is not the end of the frame (754), the internal registers must be updated to get the next receiver buffer. This is done by re-loading the buffer size limit into an invisible register 78, and loading the address of Last(H,L) into DMA(H,L). The current NXTR(H,L) is loaded into nxtr(H,L) (756). If nxtr(H) is "0", there are no more buffers available (758). In tha case, the microcontroller 70 branches to set the Frame Status Byte (RFSB) to indicate insufficient buffers were available (760). The microcontroller then jumps to RCVRSTOP (762). If nxtr(H) is not equal to "0", that means other buffers are still available, so internal register SR3, which counts the number of buffers that have been used, will be incremented by one (764).

If the value of SR3 does not exceed fifteen, then the receiver 100 will be allowed to continue to DMA data until the new buffer is filled or a frame end is reached. The Last(H,L) is loaded with the contents of nxtr(H,L) (768). The DMA(H,L) register is set to the address contained in the link field of the buffer that was just filled and the receiver is enabled (770). The microcontroller 70 then jumps to the Receive Wait Loop (750) and tests for the Frame End (738).

Figure 21:
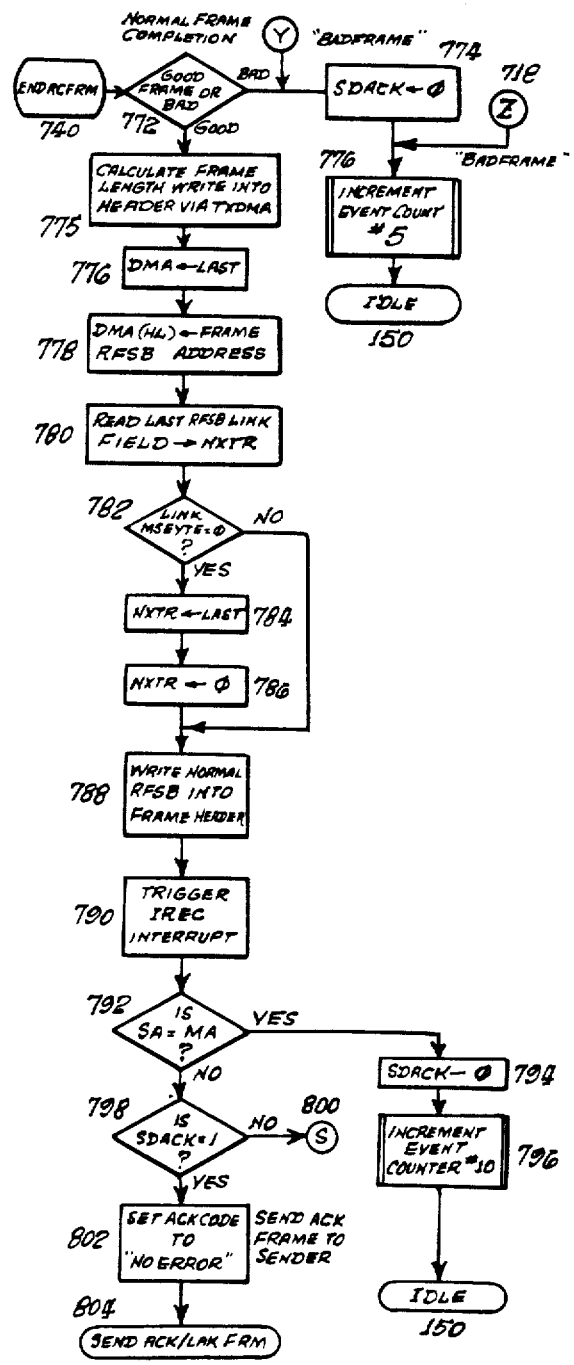

As noted earlier, if a frame end is found while in the Receive Wait Loop (750), the microcontroller 70 jumps to ENDRCFRM (740) (FIG. 21). The microcontroller 70, checks to see if the frame is good by checking the FCS and the SQ* (772). Next, if the frame is bad, SDACK is cleared (774), Event Counter No. 5 is incremented (776) and the microcontroller jumps to IDLE 150 (FIG. 8).

If the FCS and SQ* indicate a good frame was received, the Frame Length is calculated by adding the number of bytes in the received frames information field, and the DA, SA and TC fields to 6 plus two times the number of buffers used for that frame (CTR0) (Step 775). The number of bytes in the received information field, and the DA, SA and TC fields is counted by the DMA and is stored in an invisible register. Next, Last(H,L) is loaded into the DMA(H,L) (776) the Receiver Frame Status Byte is read (778), and the last buffer's link field is loaded into nxtr(H,L) (780). Then nxtrh is tested to determine whether it is zero (782). If nxtrh is zero, then Last(H,L) is loaded into nxtr(H,L) (784) and NXTR0 is cleared (786). If nxtrh is not zero (782) then step 784 and step 786 are skipped. The RFSB is written into the first receiver buffer used for this frame to indicate a valid data frame was received (788). IREC (IR03) is set to indicate a frame has been received (790).

In addition, the TAC checks to see if the source address SA is equal to MA (792). If SA = MA, this indicates two nodes having the same address exist on the network. If SA does equal MA, then SDACK is cleared to indicate not to send an acknowledgement (794) and Event Counter No. 10 is incremented so that the host will know about the duplicate node addresses (796). Control then goes to IDLE 150 on FIG. 8.

If SA is not equal to MA, the TAC then polls SDAK (798). If SDAK has not been set, that means no acknowledgement need be sent and the microcontroller will then jump to S (800) on FIG. 19. If SDACK is set, an acknowledgement frame is sent by using the SEND ACK/NACK FRM subroutine (804). Before the subroutine is called, the "no error" access control byte is loaded into AX3 (802).

The transmitter flow charts are shown in FIGS. 11-15. Upon entering the transmit mode (250), the TAC clears TSENT, RETRY, and STATE (252). Next, the TAC polls ITOKON (CR04) to determine whether to trigger an ITOK interrupt (254). If set, an ITOK interrupt is triggered (256) to indicate to the host that a token has been received by the TAC. Then the TAC checks to see if TXEN (CR06) is set (258). If TXEN is not set, the transmitter is disabled so the microcontroller 70 jumps to IDLE (150) (FIG. 8). Otherwise, if the transmitter is enabled, the TAC polls TXDEN (260). If TXDEN is set (CR07) normal transmissions are allowed; however, if TXDEN is clear, that means only access frames and token frames may be sent and data frame transmissions are suppressed. If TXDEN is clear, the microcontroller 70 will jump to J (262) on FIG. 15 and simply send a token.

If TXDEN is set, the next thing that is checked is whether CTR0 equals the access hold-off limit (AHOLT) (264). Register AHOLT contains the number of times this TAC must pass the token before it is allowed to send data on the network. Thus the network has a priority system since some members of the network can transmit every time they have the token while others can only transmit once every nth reception of the token, where n is equal to the number in AHOLT. If the CTR0 is not equal to AHOLT, this means that this TAC cannot transmit a data frame. Therefore, the token must be passed and its CTR0 must be incremented by one (266). The microcontroller must then jump to J (262) (FIG. 15).

If AHOLT = CTR0, CTR0 is cleared (267), NXTT0 is polled (268) to determine whether the transmit buffer chain is already established. If NXTT0 is set, it indicates that the TAC has the address of the start of the next frame to transmit in nxtt(H,L). If NXTT0 is clear, then the transmit chain must be established (270) in the same manner that the receiver buffer chain was established. If Last(H) equals zero (272), that means there are no frames to be sent and the microcontroller branches to J (262) on FIG. 15 to send a token. If Last(H) is not equal to zero, that means the there are data frames to be transmitted and the last link is loaded into nxtt(H,L) to establish the transmit buffer chain (276). If NXTT0 is set (268), then nxtt(H,L) is stored in Last(H,L) 274.

Next, NXTT0 is set to indicate that the transmission chain buffers are established and LASTF is cleared (278). The CTR0 is incremented by one (280), SR3 (which will count the number of buffers transmitted) is cleared, and DMA(H,L) is set to NXTT(H,L)+2, which is the address for the TFSB. The TFSB is discarded and TFCB and length are read from the buffer. The length and TFCB are set up and stored in the appropriate locations in the invisible registers 78 (Step 282). The transmitter count TXCNT which is an invisible register is set to the length of the buffer minus six.

Figure 12:
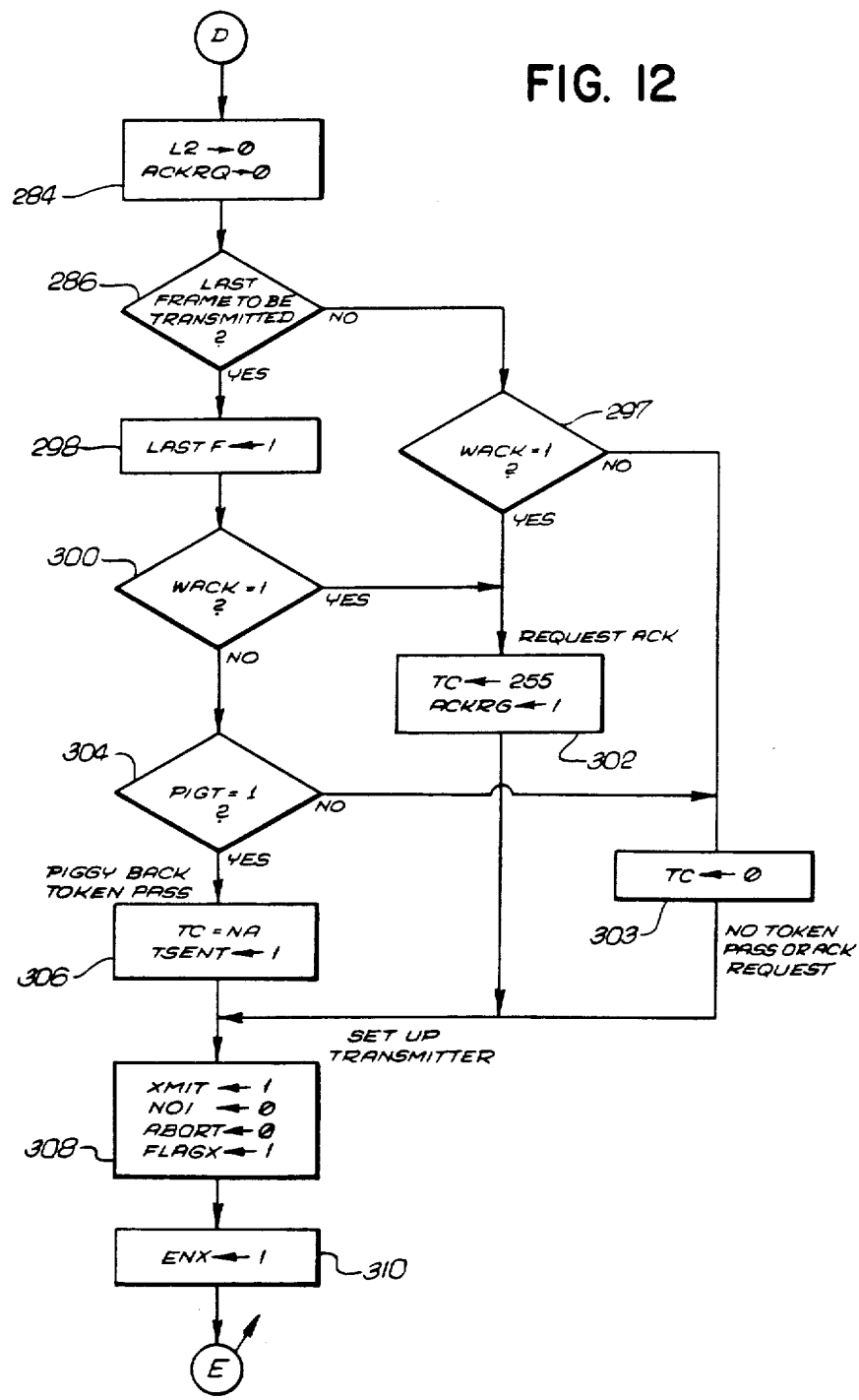

Next, L2 is cleared and ACKRQ is cleared (284) (FIG. 12). The TAC then determines whether the next frame is the last one to be sent (286).

The TAC must poll several bits to determine whether the next frame is the last to be transmitted. The TAC determines whether it should drop out of the Network state. It does this by checking ISOL. If ISOL is set, this will be the last frame. Next, TXDEN is polled to see if it is set. If TXDEN is set, data transmissions are still permitted, but if TXDEN is not set, then this means that this will be the last data frame transmitted. Next, FCBLF (bit six of TFCB) is polled to see if it has been set. If FCBLF is set, that means the host has alerted the TAC that this is the last frame to be sent. Next, CTR0 is compared with the TXLT to determine whether the maximum number of frames that this TAC can transmit on one possession of the token has been reached (296). If the maximum number has been reached, then this again means that this is the last frame.

If any of these conditions occurs, the "last frame" routine must be performed. First the last frame flag LASTF must be set (298). Next, the most significant bit of the TFCB (WACK) is polled to decide if the host wants the TAC to wait for an acknowledgement (300). If so, then the token control field is set to "255" and ACKRQ is set (302). If the host does not indicate an acknowledgement is desired then the TAC will poll the PIGT to determine whether a piggyback is desired (304). If PIGT is set, then AX3 is set equal to NA and TSENT is set (306).

If the maximum number of frames has not been reached, then the WACK bit of TFCB is polled to determine whether the host wants an acknowledgement (297). If an acknowledgement is desired, then the token control field is set to "255" and ACKRQ is set (302). If no acknowledgement is desired, then TC is set to "0" to indicate that no token pass or acknowledgement has been requested (303).

Finally, after Steps 306, 302, or 303, the transmitter must be set up (308). Next, the transmitter must be enabled (310).

Figure 13:
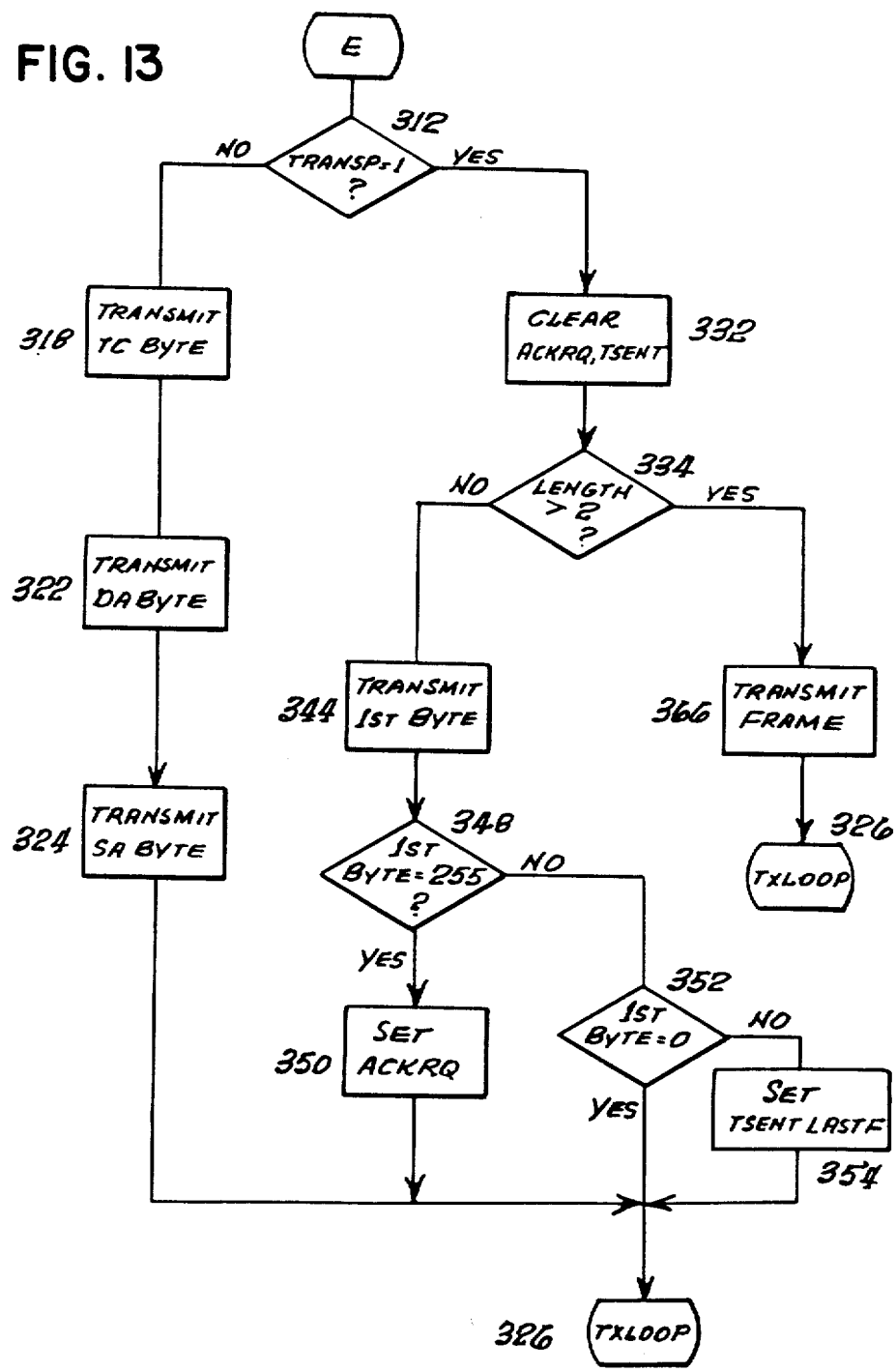

Next, the TAC must examine the TFCB to determine whether a transparent frame is to be sent. This is done by polling TRANSP (312) (FIG. 13).

If a normal data frame is to be transmitted, then the TC field which is stored in AX3 is transmitted out onto the LAN (318). Next, the destination address byte is sent onto the network (322). Then MA is transmitted onto the network (324). This will be the source address for the frame. At this point the transmit loop is entered (326) (FIG. 14).

If a transparent frame is to be sent (TRANSP=1) (312), ACKRQ and TSENT are cleared (332). Then L2 is polled to see how long the frame is. If the length of the frame is two bytes (334), this frame is then transmitted (366) and the microcontroller jumps to TXLOOP (326).

If the frame is longer than two bytes, the DMA is used to get the first byte (the token control field) and this token control byte is transmitted (344). This byte is examined to determine whether an acknowledgement request is expected (348). If the first byte has been set to "255", ACKRQ will be set (350). If this byte is not equal to "255", then the microcontroller will look to see if this byte equals zero (352). If TC equals zero, that means the transparent frame does not affect the token. If TC is not equal to zero, that means the token is being sent as a piggyback and TSENT and LASTF are set (354).

Figure 14:
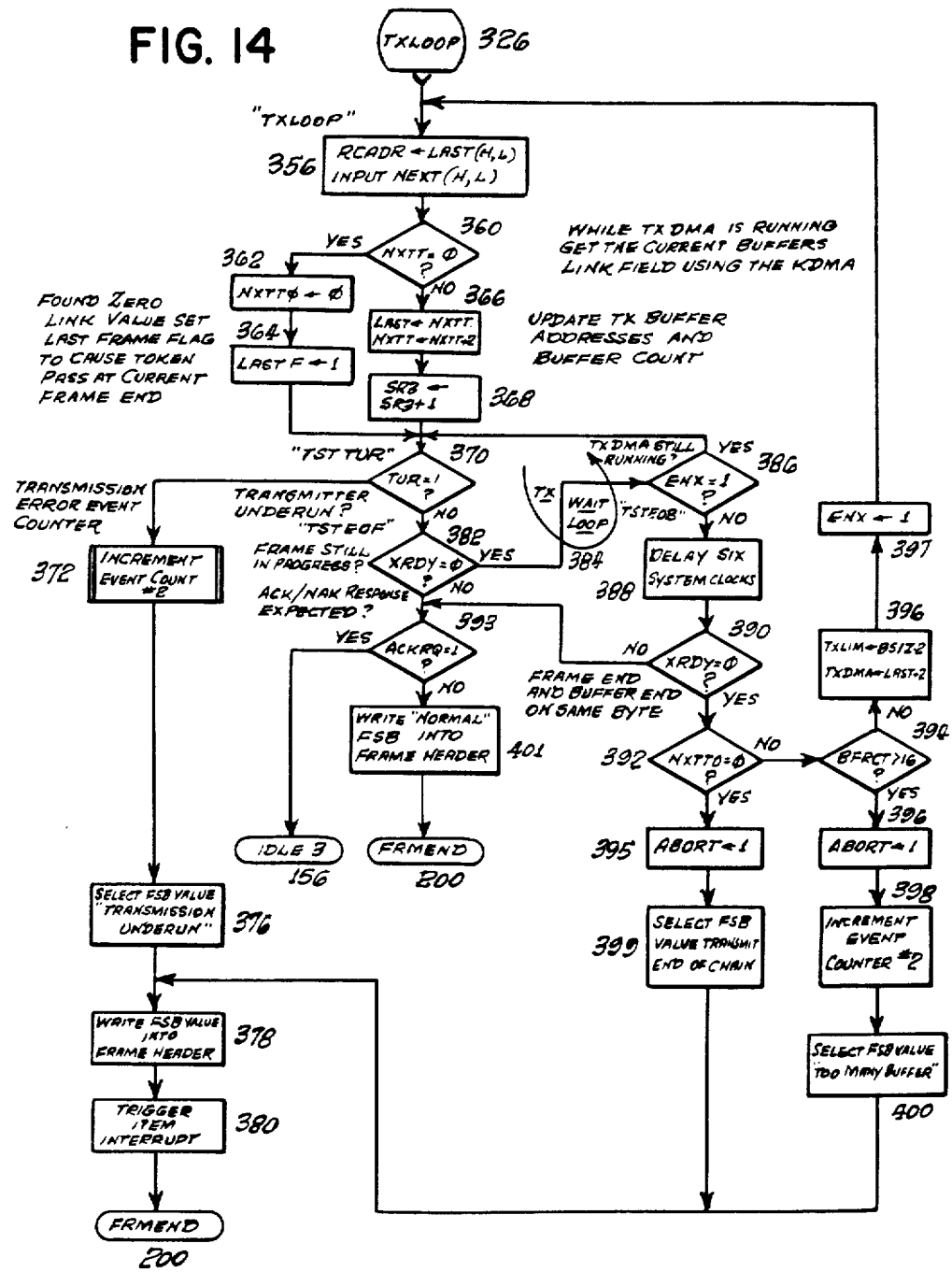

After transmitting a two-byte access control frame (366), or after an acknowledgement request is sent (350) or after the TSENT LASTF is set (354), the flowchart branches to TX LOOP on FIG. 14 to enter the transmitter loop (TX LOOP) (326). The first step of the transmitter loop is get the next buffer address from the current link field (326). If the next buffer address most significant byte (Link(H)) is equal to zero (360), this means the end of the buffer chain has been reached and NXTT0 must be cleared (362) and LASTF must be set (364) to cause a token pass at the end of the transmission of this frame. Otherwise the transmitter buffer addresses must be updated (366) and SR3 must be incremented (368). After either of these two processes, the flowchart enters the TSTTUR part of the TXLOOP.

The first thing that is done in TSTTUR is the TUR is polled (370). This bit is set when the host denies the DMA access to the memory for a long enough period that the TAC cannot get data from the transmit buffers quickly enough to transmit the data out to the network.

If an underrun condition exists, Event Counter No. 2 is incremented (372). As soon as the transmitter is ready, the TAC selects the transmit frame status byte to indicate a transmitter underrun by setting SELF and by setting the three least significant bits to "010" (376). This value is then entered into the host's memory at the TFSB address (378). Next, ITUR (IR07) is set causing an interrupt to the host to indicate that there was a transmitter underrun (380). The microcontroller 70 then jumps to the Frame End (200) (FIG. 15).

If there was no transmitter underrun error (370), then the microcontroller 70 will check to see whether the transmitter is ready (382). If it is, that means a frame is still being transmitted so the TX WAIT loop is entered (384) and ENX is polled to determine whether the DMA is still in process (386). IF DMA is still being done (ENX=1), the flowchart branches back again to check for an underrun condition (370). If the transmitter DMA has stopped (386), then the microcontroller 70 will wait six clock cycles (388). Next, XRDY is polled to determine whether the end of the frame has been reached (390). If the end has been reached, TAC branches back over to test for whether an acknowledgement is expected (393).

If the end of a frame has been detected at either step 382 or step 390, ACKRQ is polled to determine whether an acknowledgement is expected (393). If an acknowledgement is expected, then the microcontroller 70 will jump to IDLE3 (156) on FIG. 8 to wait for the acknowledgement. If ACKRQ is clear, the microcontroller writes the Transmit Frame Status Byte into the appropriate transmit buffer (401) and jumps to FRMEND (200).

If XRDY is clear (390), NXTT0 is polled to determine whether there is an additional buffer to be sent (392). If NXTT0 is still set, then the buffer count (SR3) is polled to determine whether sixteen or fewer buffers have been sent (394). If more than sixteen buffers have been sent, then there is an error and ABORT is set (396), Event Counter No. 2 is incremented to indicate too many buffers wer transmitted (398), and the TFSB is set to indicate too many buffers were sent (400). Then the program branches to write this TFSB (378). If less than sixteen buffers have been sent, then the DMA 82 is reset to transmit another buffer (396). ENX is then set (397) and the microcontroller 70 branches to TXLOOP (326).

If NXTT0 is clear (392), SELF (TFSB) will be set and the three least significant bits of TFSB will be set to "010" to indicate the end of chain has been reached (399) and ABORT is then set (395). The flowchart then branches to Write the TFSB (378).

In the FRMEND routine, (200) (FIG. 15), RETRY is cleared (402). Next, the TFSB is tested to determine whether a transmitter underrun has occurred, or more than sixteen buffers have been transmitted (404). If either error occurred, then TSENT must be cleared and NXTR0 must be set (406). If neither of these errors occurred, then the address of the next transmit buffer is loaded into DMA(H,L) (408). LASTF is polled to determine whether this is the last frame to be sent before passing the token (410). If it is not the last frame, then the microcontroller 70 jumps to I (412) on FIG. 11. If LASTF was set or the TFSB indicated a transmitter underrun or too many buffers were sent, then a ITRAN interrupt will be triggered by setting ITRAN (414). CTR0 is cleared (416) and TSENT is polled to determine whether the token has been passed (418). If the token has been passed, the microcontroller 70 jumps to IDLE3 (156) (FIG. 8). Otherwise TSENT is set (422) the SENT TOKEN frame subroutine is called (424) (FIG. 23), and upon returning the flow chart jumps to IDLE2 (154). These last three steps cause an explicit token pass.

The SEND ACK/NAK frame subroutine (FIG. 22) is the routine required to send an access control frame to acknowledge receipt of a message. First SENDACK (SR06) is cleared (850). Then the transmitter determines whether it is enabled by polling TXEN (CR06) (852). If the transmitter is not enabled, then microcontroller 70 jumps to IDLE1 (152). (See FIG. 8) If the transmitter has been enabled, then the microcontroller 70 polls GIRING (CR13) (Step 854). If GIRING is set, then INRING is polled (856). If GIRING is set and INRING is clear, then WIRING is set (858).

If GIRING is not set (854), or if INRING is set (856), or after setting WIRING (858) XMIT is set, NOI is set and FLAGX is set to enable the TAC to transmit (890). The TAC then waits for THREX to be set (892). Next the transmitter gets the SA of the data frame that was just received to use as the destination address code for the acknowledgement (894). Next, (896) and the TAC waits until THREX is one (896) and then transmits the appropriate Access Control Field which has already been setup by the microcontroller before this subroutine head been called (898). XMIT is then cleared, NOI is set and FLAGX is cleared (900). The TAC then waits until XRDY is cleared (902). When XRDY is clear, the microcontroller tests TR to see if the TAC has the token (904). If it has been set the microcontroller will continue to transmit (250) but if the TAC does not have the token then control will go to IDLE1 (152) on FIG. 8.

The TEST TOKEN routine is used for determining what type of token the TAC has received (970) (FIG. 23). If the TC field is equal to "255" (972), that means an acknowledgement request is desired. Therefore, the microcontroller 70 will compare DA to this TAC's MA to determine whether the frame is addressed to this node (974). If it is, then the TAC will set SDACK (976). If it is not, SDAK will be cleared (978). The microcontroller 70 returns by jumping back to the point of the flowchart where the subroutine was called. If the token control is not equal to "255", then SDACK is automatically cleared (980). At this point, the subroutine called "test for piggyback token," TST4PIGYTC, is entered (982). Here the TC is checked to see if it the token has been sent to this node (984). If the token is not equal to MA, the microcontroller returns. Otherwise, the microcontroller 70 determines whether it is allowed to accept the token by looking at GIRING (986). If GIRING is set, that means the TAC is allowed to accept the token and TR is set (988). If GIRING is not set, then INRING is cleared to show that the TAC is not in the ring (990).

The SEND TOKEN routine (1010) involves using NA as the TC byte (FIG. 24). NA is stored in AX2 (1011). There is also an ALTERNATE SEND TOKEN procedure (1012), which is used if TC is provided in the accumulator. Then XMIT is set, FLAGX is set and NOI is set (1014). The transmitter waits for the holding register to empty by polling THREX (1016). When the transmitter is ready, the transmitter transmits the TC (1018). XMIT is then cleared, FLAGX is cleared (1020) and the microcontroller 70 waits for XREADY to become clear (1022). When XREADY is clear, the microcontroller returns.

In summary, the present invention provides a system which permits several nodes to communicate with each other over a common external bus through a token protocol. The architecture for a large scale integrated circuit token access controller is also disclosed. The protocol provides for network initialization, network recovery and for the addition of nodes to the network.

I claim:

1. A token access controller for controlling the transmission of information fields over a network comprising a plurality of nodes connected by a transmission medium for transmitting frames, wherein each node has been assigned an unique network address and each node has a token access controller, host processor, memory, and internal bus and interface means to connect said internal bus to said transmission medium, said token access controller comprising:

means for passing the right to transmit any information field between nodes, wherein the node that has the right to transmit any information field is the only node that is enabled to transmit on the transmission medium of the network and all other nodes can only be enabled to receive the transmitted frames;

means for determining when said token access controller has finished transmitting;

means for determining the successor node, wherein the successor node is the node that said token access controller shall pass the token to when said node finishes transmitting and the successor node is unique;

means for the host processor of the node of said token access controller to instruct said token access controller where information to be transmitted is stored in the memory of the node of said token access controller;

means for transmitting information stored in the memory of the node of said token access controller to another node without the aid of the host processor of the node of said token access controller once said host processor instructs said token access controller of the location of the information in its memory;

means for the host processor of the node of said token access controller to instruct said token access controller where information to be received from another node should be stored in the memory of the node of said token access controller; and means for receiving information from another node and storing the information in the memory of the node of said token access controller without the aid of the host processor of the node of said token access controller once said host processor instructs the token access controller where the information should be stored.

2. A token access controller as described in claim 1, wherein the token access controller is part of said interface means.

3. A token access controller as described in claim 2 further including:

means for network initialization;

means for sending an acknowledgement information field upon receiving an information field wherein said token access controller indicates whether a transmission was received;

means for reestablishing the network if the token is lost; and means for eliminating duplicate tokens.

4. A token access controller as described in claim 2, wherein all information fields are frames transmitted on the transmission medium that start with a flag comprising a unique predefined field and end with a Frame Check Sequence and said flag, said token access controller further including:

a receiver comprising means for detecting the flag at the start of the information field, means for verifying whether the Frame Check Sequence is correct, means for informing the token access controller of the result of the Frame Check Sequence, and means for detecting the flag at the end of a frame; and a transmitter comprising means for creating the flag at the start of the information field, means for generating the Frame Check Sequence and means for detecting the flag at the end of the frame.

5. A token access controller as described in claim 2, further including:
means for central polling of nodes desiring to enter the network, wherein one node transmits a predefined information field over the entire range of addresses of nodes to determine if any nodes want to enter the network;
means for distributed polling of nodes desiring to enter the network, wherein each node transmits a predefined information field over a limited range of addresses to determine if any nodes want to enter the network;
means for the host processor to change the successor node to a different node.

6. A token access controller for controlling the transmission of information over a network comprising a plurality of nodes connected by a transmission medium, with only one node having the right to transmit information on the transmission medium at any given time, wherein each node is assigned a unique network address and a unique next node address corresponding to a node that will have the subsequent right to transmit information and wherein each node has a token access controller, host processor, memory, internal bus and interface means coupled to the transmission medium, said token access controller comprising:
right to transmit detecting means for detecting on the network the transmission of the network address of the node of said token access controller;
first circuit means responsive to the right to transmit detecting means for determining whether the token access controller is to transmit information onto the network;
right to transmit passing means responsive to the first circuit means for transmitting onto the network information including the next node address; and
second circuit means responsive to the right to transmit passing means for enabling the receiving of information transmitted on the network after the transmission of the next node address.

7. A token access controller chip as described in claim 6, wherein the second circuit means further includes alterable register memory means for governing the actions of the right to transmit detecting means, first circuit means, right to transmit passing means and second circuit means, wherein the host processor and the controller may alter the contents of at least some of the registers and the second circuit means may alter the contents of some of the registers in response to information transmitted on the network.

8. A token access controller as described in claim 7, wherein all information is transmitted in a frame format on the transmission medium and some frames include at least one destination information field representing the network address of which node or nodes is to receive the information, wherein the second circuit means further includes:
a "my address" memory means for storing the network address of the node;
comparator means for comparing the value in the destination field with the network address stored in the "my address" memory means; and
direct memory access means responsive to the comparator means for storing at least part of the information received from the network in the memory of the node.

9. A token access controller as described in claim 8, wherein the destination information field may be a global broadcast address and wherein the comparator means further includes first means for determining if the destination information field is the global broadcast address and the direct memory access means includes second means responsive to the first means for storing at least part of the information received from the network in the memory of the node.

10. A token access controller as described in claim 6, wherein the token access controller further includes a clock input adapted to receive to a clock signal, wherein the token access controller further includes:
a host processor alterable network dead memory means for storing a value provided by the host processor;
receiving means coupled to the interface means for detecting the transmission of information on the network;
network dead timer means responsive to the receiving means and coupled to the clock input for counting the number of clock pulses in the clock signal since the receiving means detected the transmission of information;
comparator means for determining if the counted number of clock pulses exceeds the value stored in the network dead memory means; and
reestablishment means responsive to the comparator means for determining if there is another node connected to the network.

11. A token access controller as described in claim 10, wherein the token access controller includes:
resetting means responsive to the receiver means for resetting the counted number of clock pulses in the network dead timer means to zero whenever the receiver means detects information being transmitted on the network.

12. A token access controller as described in claim 11, wherein there is a maximum number of nodes that may be connected to the network and wherein the token access controller further includes permanent memory means for storing a program for controlling the circuit means, and the reestablishment means includes:
an acknowledgement timer means coupled to the interface means and responsive to the passing of the token for monitoring the transmission medium for a specified period of time after passing the token and providing a first logic signal if a transmission is detected and a second logic signal if no transmission is detected within the specified period of time;
a "scratch pad" memory means for storing a value supplied by the circuit means;
a "my address" memory means for storing the value of the network address of the node;
a "next address" memory means for storing the value of the next node network address of the node; and
a controller means for:
(a) storing the value in the "next address" memory means in the "scratch pad" memory means;
(b) determining if the value stored in the "scratch pad" memory means is greater than the maximum number of nodes that may be connected to the network and storing a one in the "scratch pad" memory means if the contents in the "scratch pad" memory means exceeds the maximum value;

(c) determining if the contents of the "scratch pad" memory means equals the contents of the "my address" memory means and if the contents are not equal, then causing the right to transmit passing means to transmit a network address equal to the contents of the "scratch pad" register;

(d) waiting for the acknowledgement timer means to provide the first signal and then setting the contents of the "next address" memory means equal to the contents of the "scratch pad" memory means; and otherwise (e) incrementing the contents of the "scratch pad" memory means and repeating steps a through e.

13. A token access controller as described in claim 6, wherein the node has a clock coupled to the token access controller and wherein the token access controller further includes:

first means for determining whether the token access controller should wait for an acknowledgement signal from another node before transmitting additional information;

receiver means coupled to the interface means for detecting the transmission of an acknowledgement signal on the network;

host processor alterable acknowledgement memory means for storing a value representing how long the node should wait for an acknowledgement from another node;

acknowledgement timer means responsive to the first means for counting clock pulses from the clock;

comparator means for determining when the counted number of clock pulses exceeds the value stored in the acknowledgement memory means; and seccond means responsive to the comparator means and to the receiver means for alerting the host processor whether an acknowledgement was received from another node.

14. A token access controller as described in claim 6, wherein information transmitted on the network is transmitted according to a specific frame format with each frame beginning with a flag bit pattern and each frame ending with an error detecting code followed by a flag bit pattern and each frame having further information between the beginning and the end of the frame, with the number of bits of the further information varying with the type of information being transmitted, wherein the second circuit means further includes:

frame type means for detecting whether the number of bits of further information exceeds at least a first limit, whereby the token access controller recognizes the type of further information being transmitted.

15. A token access controller as described in claim 14, wherein information transmitted on the network is one of three types, with the number of bits of further information is a first number for a first type of information, is a second number for a second type of information and is a number greater than the first or second number for the third type of information, wherein the frame type means includes means for detecting if the number of bits equals the first number or the second number or exceeds the number of bits of the first and second number.

16. A token access controller as described in claim 15, wherein the first type of information calls for passing the token, the second type of information calls for transmitting certain information about the status of the token access controller and the third type of information calls for information being transmitted from one host processor to another host processor.

17. A token access controller as described in claim 15, wherein a particular pattern of a particular number of bits of further information calls for one or more nodes to enter a scanning mode for searching for additional nodes desiring to enter the network, wherein the token access controller includes:

"my address" memory means for storing the value of the network address of the node of the token access controller;

"next address" memory means for storing the value of the network address of the node to which the token access controller should pass the token;

scanning detecting means responsive to the frame type means for determining if the circuit means is to cause the token access controller to enter the scanning mode; and incrementing means responsive to the scanning detecting means for adding a one to the value stored in the "my address" memory means and storing that sum in the "next address" memory means.

18. A token access controller as described in claim 14, wherein a frame of at least one length is used for reassigning the right to transmit information to another node with the node to which the token is being passed is specified by a specific bit pattern occuring at a specific point in the frame of at least one length and representing the network address of the node to which the token is being passed, the right to transmit detecting means comprises:

"my address" memory means for storing the value of the network address of the node of the token access controller;

token frame detecting means responsive to the frame type detecting means for determining if the frame is of the type used for passing the token;

token detecting means responsive to the token frame detecting means for comparing the specific bit pattern with the value stored in the "my address" memory means; and transmitter means operative in response to the token detecting means for transmitting information stored in the host memory onto the network.

19. A token access controller as described in claim 14, wherein a frame of at least one length is used for transmitting further information, wherein the node to which the information is being transmitted is specified by a specific bit pattern occuring at a specific point in the frame and representing the network address of the node to which the information is being transmitted, the circuit means comprising:

"my address" memory means for storing the value of the network address of the node of the token access controller;

destination detecting means responsive to the frame type means for comparing the specific bit pattern with the value stored in the "my address" memory means; and receiver means responsive to the destination detecting means for storing at least part of the further information in the memory of the host processor.

20. A token access controller as described in claim 6, wherein the right to transmit passing means includes:
- a host processor alterable access holdoff memory means for storing the number of times the token access controller should hold off from transmitting before transmitting information onto the network after detection of the network address of the node of said token access controller;
- a limit memory means for storing the number of tokens the token access controller has received since the token access controller last transmitted information;
- a compararor means for comparing the value stored in the holdoff memory means with the value stored in the limit memory means; and
- token passing means responsive to the comparator means for immediately causing the right to transmit passing means to transmit whenever the value stored in the holdoff memory means is greater than the value stored in the limit memory means.

21. A token access controller as described in claim 20, wherein the token access controller further includes:
- host alterable "transmitter not enabled" means for preventing the token access controller from transmitting information onto the network and for immediately causing the right to transmit passing means to transmit the next address upon the detecting means detecting the network address of the node.

22. A token access controller as described in claim 6, wherein information is transmitted on the network in data frames and wherein the token access controller includes:
- host alterable memory means for storing the maximum amount of data frames the token access controller can transmit onto the network each time the right to transmit detecting means detects the network address of the node;
- "scratch pad" memory means for storing the number of data frames that the token access controller has transmitted since receiving the token;
- incrementing means responsive to the transmission of a data frame onto the network by the token access controller for adding one to the value stored in the "scratch pad" memory means;
- comparator means for comparing the value stored in the "scratch pad" memory means with the value stored in the host alterable memory means; and
- transmission prevention means responsive to the comparator means for preventing the transmission of more data frames prior to the right to transmit means transmitting the network address whenever the comparator indicates that the value stored in the host alterable memory means equals the value stored in the "scratch pad" memory means.

23. A token access controller as described in claim 6, wherein the token access controller further includes:
- a host alterable memory means for indicating if the token access controller is to ignore any information transmitted on the network including the transmission of the network address of the node of said token access controller; and
- controller means operable in response to the memory means for preventing the circuit means from transmitting information and receiving information; whereby the node is isolated from the network.

24. A token access controller as described in claim 15, wherein a particular bit pattern of a particular number of bits occuring at a specified point in the frame instructs the node receiving the transmitted information that the receiving node should acknowledge receipt of the transmitted information, wherein the token access controller comprises:
- acknowledgement request detecting means responsive to the frame type detecting means for determining if the node that transmitted the information is requesting an acknowledgement message;
- acknowledgement message generating means responsive to the acknowledgement request detecting means for determining whether the transmitted information was correctly received by the token access controller; and
- means for transmitting the acknowledgement message.

* * * * *